(12) United States Patent
Perry

(10) Patent No.: US 6,823,075 B2
(45) Date of Patent: Nov. 23, 2004

(54) AUTHENTICATION WATERMARKS FOR PRINTED OBJECTS AND RELATED APPLICATIONS

(75) Inventor: Burt W. Perry, Lake Oswego, OR (US)

(73) Assignee: Digimarc Corporation, Tualatin, OR (US)

( * ) Notice: Subject to any disclaimer, the term of this patent is extended or adjusted under 35 U.S.C. 154(b) by 166 days.

(21) Appl. No.: 09/775,934

(22) Filed: Feb. 2, 2001

(65) Prior Publication Data

US 2002/0012445 A1 Jan. 31, 2002

Related U.S. Application Data

(63) Continuation-in-part of application No. 09/625,577, filed on Jul. 25, 2000.

(51) Int. Cl.[7] .............................................. G06K 9/100
(52) U.S. Cl. ........................ 382/100; 358/3.28; 380/55; 705/57
(58) Field of Search ................................ 382/100, 112, 382/115, 135, 137, 138, 140, 181; 380/54, 51, 201, 232, 277, 55; 235/380, 494; 707/501.1; 713/186, 176, 155; 358/3.28; 705/1, 54, 57, 59

(56) References Cited

U.S. PATENT DOCUMENTS 3,493,674 A 2/1970 Houghton
3,569,619 A 3/1971 Simjian ...................... 235/380

(List continued on next page.)

FOREIGN PATENT DOCUMENTS

| CA | 2235002 | 12/1998 |
| DE | 3806411 | 9/1989 |
| DE | 19521969 C1 | 2/1997 |
| EP | 366381 A2 | 10/1989 |
| EP | 372 601 | 6/1990 |

(List continued on next page.)

OTHER PUBLICATIONS

U.S. patent application Ser. No. 60/000,442, Hudetz, filed Jun. 20, 1995.
U.S. patent application Ser. No. 60/082,228, Rhoads, filed Apr. 16, 1998.

(List continued on next page.)

Primary Examiner—Jayanti K. Patel
(74) Attorney, Agent, or Firm—Digimarc Corporation

(57) ABSTRACT

The disclosure describes systems for creating and authenticating printed objects using authentication and copy detection watermarks. For example, one verification system includes a watermark decoder and a verification module. The watermark decoder detects a copy detection watermark in a printed object to determine whether the printed object has been reproduced. The verification module processes a message decoded from an authentication watermark on the printed object to authenticate the printed object or bearer of the printed object. The authentication and copy detection watermarks may be implemented as the same or different watermarks. For example, the copy detection watermark may be a fragile watermark that carries the message and that degrades in response to a reproduction operation, such as photocopying or scanning and then reprinting the object. Alternatively, the authentication and copy detection watermarks may be separate watermarks embedded in an image that is printed on the object. The authentication watermark, in some applications, includes an identifier that links the object to a database entry with related information about the object. This related information can be used to check the bearer of the object by comparing it with attributes of the bearer (such as a user ID or photo) or the validity of the object by comparing it with attributes that are visible or machine readable on the object.

19 Claims, 2 Drawing Sheets

U.S. PATENT DOCUMENTS

| | | |
|---|---|---|
| 3,576,369 A | 4/1971 | Wick et al. |
| 3,585,290 A | 6/1971 | Sanford |
| 3,655,162 A | 4/1972 | Yamamoto et al. |
| 3,703,628 A | 11/1972 | Philipson, Jr. |
| 3,809,806 A | 5/1974 | Walker et al. |
| 3,838,444 A | 9/1974 | Loughlin et al. |
| 3,914,877 A | 10/1975 | Hines |
| 3,922,074 A | 11/1975 | Ikegami et al. |
| 3,971,917 A | 7/1976 | Maddox et al. |
| 3,977,785 A | 8/1976 | Harris |
| 3,982,064 A | 9/1976 | Barnaby |
| 3,984,624 A | 10/1976 | Waggener .................. 348/473 |
| 4,025,851 A | 5/1977 | Haselwood et al. |
| 4,184,700 A | 1/1980 | Greenaway |
| 4,225,967 A | 9/1980 | Miwa et al. |
| 4,230,990 A | 10/1980 | Lert, Jr. et al. ............... 725/22 |
| 4,231,113 A | 10/1980 | Blasbalg |
| 4,238,849 A | 12/1980 | Gassmann .................. 348/467 |
| 4,252,995 A | 2/1981 | Schmidt et al. |
| 4,262,329 A | 4/1981 | Bright et al. |
| 4,296,326 A | 10/1981 | Haslop et al. ................. 283/70 |
| 4,297,729 A | 10/1981 | Steynor et al. ................ 360/40 |
| 4,313,197 A | 1/1982 | Maxemchuk ................ 370/210 |
| 4,367,488 A | 1/1983 | Leventer et al. ............ 370/204 |
| 4,379,947 A | 4/1983 | Warner ....................... 370/204 |
| 4,380,027 A | 4/1983 | Leventer et al. ............ 348/467 |
| 4,389,671 A | 6/1983 | Posner et al. |
| 4,395,600 A | 7/1983 | Lundy et al. .............. 381/73.1 |
| 4,416,001 A | 11/1983 | Ackerman |
| 4,423,415 A | 12/1983 | Goldman |
| 4,425,642 A | 1/1984 | Moses et al. ................ 370/477 |
| 4,476,468 A | 10/1984 | Goldman |
| 4,528,588 A | 7/1985 | Löfberg ....................... 340/5.1 |
| 4,532,508 A | 7/1985 | Ruell |
| 4,547,804 A | 10/1985 | Greenberg .................. 348/460 |
| 4,553,261 A | 11/1985 | Froessl |
| 4,590,366 A | 5/1986 | Rothfjell |
| 4,595,950 A | 6/1986 | Lofberg |
| 4,618,257 A | 10/1986 | Bayne et al. .................. 356/71 |
| 4,637,051 A | 1/1987 | Clark |
| 4,639,779 A | 1/1987 | Greenberg |
| 4,647,974 A | 3/1987 | Butler et al. |
| 4,654,867 A | 3/1987 | Labedz et al. |
| 4,660,221 A | 4/1987 | Dlugos |
| 4,663,518 A | 5/1987 | Borror et al. |
| 4,665,431 A | 5/1987 | Cooper |
| 4,672,605 A | 6/1987 | Hustig et al. ................ 370/201 |
| 4,675,746 A | 6/1987 | Tetrick et al. ............... 358/296 |
| 4,677,435 A | 6/1987 | D'Agraives et al. |
| 4,682,794 A | 7/1987 | Margolin |
| 4,703,476 A | 10/1987 | Howard |
| 4,712,103 A | 12/1987 | Gotanda |
| 4,718,106 A | 1/1988 | Weinblatt |
| 4,723,149 A | 2/1988 | Harada |
| 4,739,377 A | 4/1988 | Allen .......................... 355/133 |
| 4,750,173 A | 6/1988 | Bluthgen .................... 370/528 |
| 4,765,656 A | 8/1988 | Becker et al. |
| 4,775,901 A | 10/1988 | Nakano |
| 4,776,013 A | 10/1988 | Kafri et al. |
| 4,805,020 A | 2/1989 | Greenberg |
| 4,807,031 A | 2/1989 | Broughton et al. ......... 348/460 |
| 4,811,357 A | 3/1989 | Betts et al. |
| 4,811,408 A | 3/1989 | Goldman |
| 4,820,912 A | 4/1989 | Samyn |
| 4,835,517 A | 5/1989 | van der Gracht et al. |
| 4,855,827 A | 8/1989 | Best ............................ 348/485 |
| 4,864,618 A | 9/1989 | Wright et al. |
| 4,866,771 A | 9/1989 | Bain |
| 4,874,936 A | 10/1989 | Chandler et al. |
| 4,876,617 A | 10/1989 | Best et al. |
| 4,879,747 A | 11/1989 | Leighton et al. ............. 713/186 |
| 4,884,139 A | 11/1989 | Pommier |
| 4,885,632 A | 12/1989 | Mabey et al. |
| 4,888,798 A | 12/1989 | Earnest ........................ 705/54 |
| 4,903,301 A | 2/1990 | Kondo et al. |
| 4,908,836 A | 3/1990 | Rushforth et al. ........... 375/152 |
| 4,908,873 A | 3/1990 | Philibert et al. ............. 382/100 |
| 4,918,484 A | 4/1990 | Ujiie et al. |
| 4,920,503 A | 4/1990 | Cook |
| 4,921,278 A | 5/1990 | Shiang et al. |
| 4,926,325 A * | 5/1990 | Benton et al. ................. 705/39 |
| 4,939,515 A | 7/1990 | Adelson |
| 4,941,150 A | 7/1990 | Iwasaki |
| 4,943,973 A | 7/1990 | Werner |
| 4,943,976 A | 7/1990 | Ishigaki |
| 4,944,036 A | 7/1990 | Hyatt .......................... 367/43 |
| 4,947,028 A | 8/1990 | Gorog ......................... 235/380 |
| 4,963,998 A | 10/1990 | Maufe |
| 4,965,827 A | 10/1990 | McDonald |
| 4,967,273 A | 10/1990 | Greenberg |
| 4,969,041 A | 11/1990 | O'Grady et al. ............. 348/473 |
| 4,972,471 A | 11/1990 | Gross et al. |
| 4,972,475 A | 11/1990 | Sant'Anselmo |
| 4,972,476 A | 11/1990 | Nathans ....................... 713/186 |
| 4,977,594 A | 12/1990 | Shear .......................... 705/53 |
| 4,979,210 A | 12/1990 | Nagata et al. |
| 4,996,530 A | 2/1991 | Hilton |
| 5,003,590 A | 3/1991 | Lechner et al. |
| 5,010,405 A | 4/1991 | Schreiber et al. |
| 5,023,907 A | 6/1991 | Johnson ...................... 710/200 |
| 5,027,401 A | 6/1991 | Soltesz ........................ 380/54 |
| 5,034,982 A | 7/1991 | Heninger et al. |
| 5,036,513 A | 7/1991 | Greenblatt |
| 5,040,059 A | 8/1991 | Leberl ......................... 348/135 |
| 5,053,956 A | 10/1991 | Donald ........................ 713/601 |
| 5,062,666 A | 11/1991 | Mowry et al. ................ 283/67 |
| 5,063,446 A | 11/1991 | Gibson |
| 5,073,899 A | 12/1991 | Collier et al. |
| 5,073,925 A | 12/1991 | Nagata et al. |
| 5,075,773 A | 12/1991 | Pullen et al. |
| 5,077,608 A | 12/1991 | Dubner |
| 5,077,795 A | 12/1991 | Rourke et al. |
| 5,079,648 A | 1/1992 | Maufe |
| 5,091,966 A | 2/1992 | Bloomberg et al. |
| 5,095,196 A | 3/1992 | Miyata ....................... 235/382 |
| 5,103,459 A | 4/1992 | Gilhousen et al. .......... 370/206 |
| 5,113,437 A | 5/1992 | Best |
| 5,113,445 A | 5/1992 | Wang .......................... 380/51 |
| 5,128,525 A | 7/1992 | Stearns et al. |
| 5,144,660 A | 9/1992 | Rose |
| 5,146,457 A | 9/1992 | Veldhuis et al. ............. 370/523 |
| 5,148,498 A | 9/1992 | Resnikoff et al. |
| 5,150,409 A | 9/1992 | Elsner |
| 5,161,210 A | 11/1992 | Druyvesteyn et al. |
| 5,166,676 A | 11/1992 | Milheiser |
| 5,168,147 A | 12/1992 | Bloomberg |
| 5,181,786 A | 1/1993 | Hujink ......................... 400/61 |
| 5,185,736 A | 2/1993 | Tyrrell et al. |
| 5,199,081 A | 3/1993 | Saito et al. |
| 5,200,822 A | 4/1993 | Bronfin et al. ................ 725/22 |
| 5,212,551 A | 5/1993 | Conanan |
| 5,213,337 A | 5/1993 | Sherman ...................... 463/40 |
| 5,216,724 A | 6/1993 | Suzuki et al. ............... 382/135 |
| 5,228,056 A | 7/1993 | Schilling |
| 5,243,411 A | 9/1993 | Shirochi et al. |
| 5,243,423 A | 9/1993 | DeJean et al. ............... 348/473 |
| 5,245,165 A | 9/1993 | Zhang |
| 5,245,329 A | 9/1993 | Gokcebay |
| 5,247,364 A | 9/1993 | Banker et al. |
| 5,253,078 A | 10/1993 | Balkanski et al. |
| 5,257,119 A | 10/1993 | Funada et al. |

| | | | | | | |
|---|---|---|---|---|---|---|
| 5,259,025 A | 11/1993 | Monroe .................. 705/75 | | 5,548,646 A | 8/1996 | Aziz et al. |
| 5,267,334 A | 11/1993 | Normille et al. | | 5,557,333 A | 9/1996 | Jungo et al. |
| 5,280,537 A | 1/1994 | Sugiyama et al. ........ 370/529 | | 5,559,559 A | 9/1996 | Jungo et al. |
| 5,284,364 A * | 2/1994 | Jain ........................ 283/87 | | 5,568,179 A | 10/1996 | Diehl et al. |
| 5,288,976 A | 2/1994 | Citron ..................... 235/375 | | 5,568,550 A | 10/1996 | Ur ............................ 382/306 |
| 5,291,243 A | 3/1994 | Heckman et al. .......... 399/3 | | 5,568,570 A | 10/1996 | Rabbani |
| 5,293,399 A | 3/1994 | Hefti | | 5,572,010 A | 11/1996 | Petrie |
| 5,295,203 A | 3/1994 | Krause et al. .............. 382/248 | | 5,572,247 A | 11/1996 | Montgomery |
| 5,299,019 A | 3/1994 | Pack et al. | | 5,576,532 A | 11/1996 | Hecht |
| 5,305,400 A | 4/1994 | Butera | | 5,579,124 A | 11/1996 | Aijala et al. |
| 5,315,098 A | 5/1994 | Tow ........................ 235/494 | | 5,582,103 A | 12/1996 | Tanaka et al. |
| 5,319,453 A | 6/1994 | Copriviza et al. | | 5,587,743 A | 12/1996 | Montgomery |
| 5,319,724 A | 6/1994 | Blonstein et al. | | 5,590,197 A | 12/1996 | Chen et al. |
| 5,319,735 A | 6/1994 | Preuss et al. | | 5,594,226 A | 1/1997 | Steger ...................... 235/379 |
| 5,321,470 A | 6/1994 | Hasuo et al. .............. 399/366 | | 5,598,526 A | 1/1997 | Daniel et al. .............. 345/540 |
| 5,325,167 A | 6/1994 | Melen | | 5,602,920 A | 2/1997 | Bestler et al. |
| 5,327,237 A | 7/1994 | Gerdes et al. | | 5,606,609 A | 2/1997 | Houser et al. |
| 5,337,361 A | 8/1994 | Wang et al. | | 5,611,575 A | 3/1997 | Petrie |
| 5,337,362 A | 8/1994 | Gormish et al. | | 5,613,004 A | 3/1997 | Cooperman et al. ........ 380/28 |
| 5,349,655 A | 9/1994 | Mann | | 5,613,012 A | 3/1997 | Hoffman et al. |
| 5,351,302 A | 9/1994 | Leighton et al. | | 5,614,940 A | 3/1997 | Cobbley et al. |
| 5,371,792 A | 12/1994 | Asai et al. | | 5,617,119 A | 4/1997 | Briggs et al. .............. 707/100 |
| 5,374,976 A | 12/1994 | Spannenburg ............ 399/366 | | 5,617,148 A | 4/1997 | Montgomery |
| 5,379,345 A | 1/1995 | Greenberg ................ 455/2.01 | | 5,629,770 A | 5/1997 | Brassil |
| 5,387,941 A | 2/1995 | Montgomery et al. | | 5,629,980 A | 5/1997 | Stefik et al. |
| 5,394,274 A | 2/1995 | Kahn | | 5,636,292 A | 6/1997 | Rhoads .................... 382/232 |
| 5,396,559 A | 3/1995 | McGrew | | 5,638,443 A | 6/1997 | Stefik ...................... 705/54 |
| 5,398,283 A | 3/1995 | Virga | | 5,638,446 A | 6/1997 | Rubin |
| 5,404,160 A | 4/1995 | Schober et al. | | 5,640,193 A | 6/1997 | Wellner .................... 725/100 |
| 5,404,377 A | 4/1995 | Moses | | 5,646,999 A | 7/1997 | Saito ........................ 705/54 |
| 5,408,542 A | 4/1995 | Callahan | | 5,652,626 A | 7/1997 | Kawakami et al. ........ 348/463 |
| 5,416,307 A | 5/1995 | Danek et al. .............. 235/449 | | 5,659,164 A | 8/1997 | Schmid .................... 235/375 |
| 5,418,853 A | 5/1995 | Kanota et al. | | 5,661,574 A | 8/1997 | Kawana |
| 5,422,963 A | 6/1995 | Chen et al. | | 5,663,766 A | 9/1997 | Sizer, II .................... 348/473 |
| 5,422,995 A | 6/1995 | Aoki et al. | | 5,664,018 A | 9/1997 | Leighton .................. 380/54 |
| 5,425,100 A | 6/1995 | Thomas et al. | | 5,665,951 A | 9/1997 | Newman et al. ............ 235/375 |
| 5,428,606 A | 6/1995 | Moskowitz | | 5,666,487 A | 9/1997 | Goodman et al. |
| 5,428,607 A | 6/1995 | Hiller et al. .............. 370/352 | | 5,668,636 A | 9/1997 | Beach et al. .............. 358/296 |
| 5,428,731 A | 6/1995 | Powers .................... 707/501.1 | | 5,671,282 A | 9/1997 | Wolff et al. ................ 713/179 |
| 5,432,329 A * | 7/1995 | Colgate et al. ............ 235/487 | | 5,673,316 A | 9/1997 | Auerbach et al. .......... 705/51 |
| 5,432,542 A | 7/1995 | Thibadeau et al. | | 5,687,236 A | 11/1997 | Moskowitz et al. ........ 380/28 |
| 5,432,870 A | 7/1995 | Schwartz | | 5,710,636 A | 1/1998 | Curry ...................... 358/3.28 |
| 5,444,779 A | 8/1995 | Daniele | | 5,719,939 A | 2/1998 | Tel .......................... 713/179 |
| 5,446,488 A | 8/1995 | Leslie | | 5,721,788 A | 2/1998 | Powell et al. .............. 382/100 |
| 5,450,122 A | 9/1995 | Keene | | 5,727,092 A | 3/1998 | Sandford, II et al. ........ 382/251 |
| 5,450,490 A | 9/1995 | Jensen et al. | | 5,735,547 A | 4/1998 | Morelle et al. ............ 283/67 |
| 5,461,426 A | 10/1995 | Limberg et al. | | 5,740,244 A | 4/1998 | Indeck et al. .............. 713/176 |
| 5,463,209 A | 10/1995 | Figh ........................ 235/383 | | 5,742,845 A | 4/1998 | Wagner .................... 395/821 |
| 5,469,222 A | 11/1995 | Sprague .................. 348/580 | | 5,745,604 A | 4/1998 | Rhoads .................... 382/232 |
| 5,469,506 A | 11/1995 | Berson et al. .............. 713/186 | | 5,761,686 A | 6/1998 | Bloomberg ................ 707/529 |
| 5,473,631 A | 12/1995 | Moses | | 5,768,426 A | 6/1998 | Rhoads .................... 382/232 |
| 5,479,168 A | 12/1995 | Johnson et al. | | 5,778,102 A | 7/1998 | Sandford, II et al. ........ 382/251 |
| 5,481,294 A | 1/1996 | Thomas et al. | | 5,790,693 A | 8/1998 | Graves et al. .............. 382/135 |
| 5,488,664 A | 1/1996 | Shamir | | 5,790,697 A | 8/1998 | Munro et al. .............. 382/135 |
| 5,493,677 A | 2/1996 | Bfalogh .................. 707/104.1 | | 5,804,803 A | 9/1998 | Cragun et al. ............ 235/375 |
| 5,495,581 A | 2/1996 | Tsai ........................ 707/526 | | 5,809,160 A | 9/1998 | Powell et al. .............. 382/100 |
| 5,496,071 A | 3/1996 | Walsh ...................... 283/70 | | 5,809,317 A | 9/1998 | Kogan et al. .............. 707/501.1 |
| 5,499,294 A | 3/1996 | Friedman | | 5,817,205 A | 10/1998 | Kaule ...................... 382/294 |
| 5,502,576 A | 3/1996 | Ramsay et al. ............ 358/444 | | 5,818,441 A | 10/1998 | Throckmorton et al. .... 345/717 |
| 5,515,081 A | 5/1996 | Vasilik | | 5,819,289 A | 10/1998 | Sanford, II et al. ........ 707/104.1 |
| 5,521,722 A | 5/1996 | Colvill et al. .............. 358/500 | | 5,825,871 A | 10/1998 | Mark ...................... 379/357.03 |
| 5,524,933 A | 6/1996 | Kunt et al. | | 5,825,892 A | 10/1998 | Braudaway et al. ........ 380/51 |
| 5,530,751 A | 6/1996 | Morris | | 5,838,458 A | 11/1998 | Tsai ........................ 358/402 |
| 5,530,759 A | 6/1996 | Braudaway et al. ........ 380/54 | | 5,838,814 A | 11/1998 | Moore |
| 5,530,852 A | 6/1996 | Meske, Jr. et al. .......... 709/206 | | 5,841,886 A | 11/1998 | Rhoads .................... 382/115 |
| 5,532,920 A | 7/1996 | Hartrick et al. | | 5,841,978 A | 11/1998 | Rhoads .................... 709/217 |
| 5,537,223 A | 7/1996 | Curry | | 5,848,144 A | 12/1998 | Ahrens .................... 379/219 |
| 5,539,471 A | 7/1996 | Myhrvold et al. | | 5,848,413 A | 12/1998 | Wolff ...................... 707/10 |
| 5,539,735 A | 7/1996 | Moskowitz | | 5,852,673 A | 12/1998 | Young ...................... 382/164 |
| 5,541,662 A | 7/1996 | Adams et al. | | 5,857,038 A | 1/1999 | Owada et al. .............. 382/284 |
| 5,544,255 A | 8/1996 | Smithies et al. | | 5,862,218 A | 1/1999 | Steinberg .................. 713/176 |

| | | | |
|---|---|---|---|
| 5,862,260 A | 1/1999 | Rhoads | 382/232 |
| 5,869,819 A | 2/1999 | Knowles et al. | 235/375 |
| 5,871,615 A | 2/1999 | Harris | 162/140 |
| 5,872,589 A | 2/1999 | Morales | 725/24 |
| 5,875,249 A | 2/1999 | Mintzer et al. | 380/54 |
| 5,893,101 A | 4/1999 | Balogh et al. | 707/100 |
| 5,898,779 A | 4/1999 | Squilla et al. | 713/176 |
| 5,900,608 A | 5/1999 | Iida | 235/381 |
| 5,902,353 A | 5/1999 | Reber et al. | 709/219 |
| 5,903,729 A | 5/1999 | Reber et al. | 709/219 |
| 5,905,248 A | 5/1999 | Russell et al. | 235/462.15 |
| 5,905,251 A | 5/1999 | Knowles | 235/472.01 |
| 5,905,810 A | 5/1999 | Jones et al. | 382/135 |
| 5,913,210 A | 6/1999 | Call | 707/4 |
| 5,915,027 A | 6/1999 | Cox et al. | 380/54 |
| 5,930,767 A | 7/1999 | Reber et al. | 705/26 |
| 5,932,863 A | 8/1999 | Rathus et al. | 235/462.15 |
| 5,933,798 A | 8/1999 | Linnartz | 702/91 |
| 5,933,829 A | 8/1999 | Durst et al. | 707/10 |
| 5,938,726 A | 8/1999 | Reber et al. | 709/217 |
| 5,938,727 A | 8/1999 | Ikeda | 709/218 |
| 5,939,695 A | 8/1999 | Nelson | 235/383 |
| 5,940,595 A | 8/1999 | Reber et al. | 709/227 |
| 5,949,055 A | 9/1999 | Fleet et al. | 235/469 |
| 5,950,173 A | 9/1999 | Perkowski | 705/26 |
| 5,963,916 A | 10/1999 | Kaplan | 705/26 |
| 5,971,277 A | 10/1999 | Cragun et al. | 235/462.01 |
| 5,974,141 A | 10/1999 | Saito | 705/52 |
| 5,974,548 A | 10/1999 | Adams | 713/200 |
| 5,978,773 A | 11/1999 | Hudetz et al. | 705/23 |
| 5,979,757 A | 11/1999 | Tracy et al. | 235/383 |
| 5,983,218 A | 11/1999 | Syeda-Mahmoo | 707/3 |
| 5,991,426 A | 11/1999 | Cox et al. | 382/100 |
| 6,005,501 A | 12/1999 | Wolosewicz | 341/52 |
| 6,024,287 A | 2/2000 | Takai et al. | |
| 6,035,177 A | 3/2000 | Moses et al. | 725/22 |
| 6,052,486 A | 4/2000 | Knowlton et al. | 382/100 |
| 6,064,764 A | 5/2000 | Bhaskaran et al. | 382/183 |
| 6,122,403 A | 9/2000 | Rhoads | 382/233 |
| 6,166,750 A | 12/2000 | Negishi | 347/131 |
| 6,188,787 B1 | 2/2001 | Ohmae et al. | |
| 6,233,684 B1 | 5/2001 | Stefik et al. | |
| 6,243,480 B1 | 6/2001 | Zhao et al. | |
| 6,246,777 B1 | 6/2001 | Agarwal et al. | 382/100 |
| 6,266,430 B1 | 7/2001 | Rhoads et al. | 382/100 |
| 6,282,654 B1 | 8/2001 | Ikeda et al. | 713/200 |
| 6,301,360 B1 | 10/2001 | Bocionek et al. | |
| 6,310,956 B1 | 10/2001 | Morito et al. | |
| 6,311,214 B1 | 10/2001 | Rhoads | 709/217 |
| 6,321,648 B1 | 11/2001 | Berson et al. | |
| 6,321,981 B1 | 11/2001 | Ray et al. | |
| 6,324,573 B1 | 11/2001 | Rhoads | 709/218 |
| 6,332,031 B1 | 12/2001 | Rhoads et al. | 382/100 |
| 6,334,187 B1 | 12/2001 | Kadano | 713/176 |
| 6,343,204 B1 | 1/2002 | Yang | |
| 6,345,104 B1 | 2/2002 | Rhoads | 382/100 |
| 6,359,985 B1 | 3/2002 | Koch et al. | |
| 6,367,013 B1 * | 4/2002 | Bisbee et al. | 713/178 |
| 6,389,151 B1 | 5/2002 | Carr et al. | 382/100 |
| 6,427,140 B1 * | 7/2002 | Ginter et al. | 705/80 |
| 2001/0001854 A1 | 5/2001 | Shena et al. | |
| 2001/0017709 A1 | 8/2001 | Murakami et al. | |
| 2001/0018742 A1 | 8/2001 | Hirai | |
| 2001/0021144 A1 | 9/2001 | Oshima et al. | |
| 2001/0024510 A1 | 9/2001 | Iwamura | |
| 2001/0026618 A1 | 10/2001 | Van Wie et al. | |
| 2001/0026629 A1 | 10/2001 | Oki | |
| 2001/0030759 A1 | 10/2001 | Hayashi et al. | |
| 2001/0037455 A1 | 11/2001 | Lawandy et al. | |
| 2001/0049662 A1 | 12/2001 | Linnartz et al. | |
| 2001/0053299 A1 | 12/2001 | Matsunoshita et al. | |
| 2001/0054144 A1 | 12/2001 | Epstein et al. | |
| 2001/0055258 A1 | 12/2001 | Carson et al. | |
| 2002/0001095 A1 | 1/2002 | Kawakami et al. | |
| 2002/0003891 A1 | 1/2002 | Hoshino | |
| 2002/0009208 A1 | 1/2002 | Alattar et al. | 382/100 |
| 2002/0080396 A1 | 1/2002 | Silverbrook et al. | |
| 2002/0018228 A1 | 2/2002 | Torigoe | |
| 2002/0051237 A1 | 5/2002 | Ohara | |

FOREIGN PATENT DOCUMENTS

| | | | |
|---|---|---|---|
| EP | 411 232 | 2/1991 | |
| EP | 418 964 A1 | 3/1991 | |
| EP | 441 702 | 8/1991 | |
| EP | 493 091 | 7/1992 | |
| EP | 058 482 | 8/1992 | |
| EP | 551 016 | 7/1993 | |
| EP | 581 317 | 2/1994 | |
| EP | 605 208 | 7/1994 | |
| EP | 649 074 | 4/1995 | |
| EP | 705 025 | 4/1996 | |
| EP | 711061 | 5/1996 | |
| EP | 0789480 | 8/1997 | |
| EP | 872995 | 10/1998 | |
| EP | 0642060 B1 | 4/1999 | |
| EP | 991047 | 4/2000 | |
| EP | 1122939 | 8/2001 | |
| EP | 1152592 | 11/2001 | |
| EP | 1158514 | 11/2001 | |
| GB | 2063018 | 5/1981 | |
| GB | 2067871 | 7/1981 | |
| GB | 2196167 | 4/1988 | |
| GB | 2204984 | 11/1988 | |
| JP | 4-248771 | 2/1992 | |
| JP | 5/242217 | 9/1993 | |
| JP | 8-30759 | 2/1996 | |
| WO | WO89/08915 | 9/1989 | |
| WO | WO 93/25038 | 12/1993 | |
| WO | WO94/27228 | 11/1994 | |
| WO | WO95/04665 | 2/1995 | |
| WO | WO95/10813 | 4/1995 | |
| WO | WO 95/10835 | 4/1995 | |
| WO | WO 95/14289 | 5/1995 | |
| WO | WO 95/20291 | 7/1995 | |
| WO | WO 96/26494 | 8/1996 | |
| WO | WO 96/27259 | 9/1996 | |
| WO | WO97/43736 | 11/1997 | |
| WO | WO98/14887 | 4/1998 | |
| WO | WO98/20642 | 5/1998 | |
| WO | WO98/24050 | 6/1998 | |
| WO | WO98/40823 | 9/1998 | |
| WO | WO98/49813 | 11/1998 | |
| WO | WO99/34277 | 7/1999 | |
| WO | WO99/36876 | 7/1999 | 382/100 |
| WO | WO 00/39953 | 7/2000 | |
| WO | WO00/44131 | 7/2000 | |
| WO | WO00/62258 | 10/2000 | |
| WO | WO 01/08405 | 2/2001 | |
| WO | WO 01/80169 | 10/2001 | 382/100 |

OTHER PUBLICATIONS

U.S. patent application Ser. No. 60/141,763, Davis, filed Jun. 30, 1999.

U.S. patent application Ser. No. 60/158,015, Davis et al., filed Oct. 6, 1999.

U.S. patent application Ser. No. 09/314,648, Rodriguez et al., filed May 19, 1999.

U.S. patent application Ser. No. 09/342,688, Rodriguez et al., Jun. 29, 1999.

U.S. patent application Ser. No. 09/342,971, Rodriguez et al., Jun. 29, 1999.
U.S. patent application Ser. No. 09/679,261, Davis et al., Oct. 4, 2000.
U.S. patent application Ser. No. 09/562,517, Davis et al., May 1, 2000.
U.S. patent application Ser. No. 09/547,664, Rhoads et al., Apr. 12, 2000.
U.S. patent application Ser. No. 09/571,442, Rhoads et al., May 15, 2000.
U.S. patent application Ser. No. 09/858,189, Rhoads et al., May 14, 2001.
U.S. patent application Ser. No. 09/631,409, Brundage et al., Aug. 3, 2000.
U.S. patent application Ser. No. 09/452,021, Davis et al., Nov. 30, 1999.
U.S. patent application Ser. No. 09/629,401, Seder et al., Aug. 1, 2000.
U.S. patent application Ser. No. 09/473,396, Evans et al., Dec. 28, 1999.
U.S. patent application Ser. No. 09/563,664, Levy et al., May 2, 2000.
U.S. patent application Ser. No. 09/670,115, Rhoads et al., Sep. 29, 2000.
Brassil et al., Electronic Marking and Identification Techniques to Discourage Document Copying, Proceedings of INFOCOM '94 Conference on Computer, IEEE Commun. Soc Conference, Jun. 12–16, 1994, 1278–1287.
Bruckstein, A.M., Richardson, T.J., A holographic transform domain image watermarking method, Circuits, Systems, and Signal Processing vol. 17, No. 3, p. 361–389, 1998. This paper includes an appendix containing an internal memo of Bell Labs, which according to the authors of the paper, was dated Sep. 1994.
"High Water FBI Limited Presentation Image Copyright Protection Software," FBI Ltd brochure, Jul., 1995, 17 pages.
Koch et al., "Copyright Protection for Multimedia Data," Fraunhofer Institute for Computer Graphics, Dec. 16, 1994, 15 pages.
Koch et al., "Towards Robust and Hidden Image Copyright Labeling," Proc. of 1995 IEEE Workshop on Nonlinear Signal and Image Processing, Jun. 20–22, 1995, 4 pages.
Kurak et al., "A Cautionary Note On Image Downgrading," 1992 IEEE, pp. 153–159.
Mintzer et al., "Safeguarding Digital library Contents and Users Digital Watermarking," D–Lib Magazine, Dec. 1997: ISSN 1082–9873.
Rindfrey, "Towards an Equitable System for Access Control and Copyright Protection in Broadcast Image Services: The Equicrypt Approach," Intellectual Property Rights and New Technologies, Proc. of the Conference, R. Oldenbourg Verlag Wien Munchen 1995, 12 pages.
Schreiber et al., "A Compatible High–Definition Television System Using the Noise–Margin Method of Hiding Enhancement Information," SMPTE Journal, Dec. 1989, pp. 873–879.
SDMI Example use Scenarios (Non–Exhaustive), Version 1.2, Jun. 16, 1999.
Szepanski, "A Signal Theoretic Method for Creating Forgery–Proof Documents for Automatic Verification," Proceedings 1979 Carnahan Conference on Crime Countermeasures, May 16, 1979, pp. 101–109.

Szepanski, "Additive Binary Data Transmission for Video Signals," Papers Presented at Conf. Of Comm. Engineering Soc. Sep. 30–Oct. 3, 1980, Technical Reports vol. 74, pp. 342–352.
Tanaka et al., "A Visual Retrieval System with Private Information for Image Database," Proceeding International Conference on DSP Applications and Technology, Oct. 1991, pp. 415–421.
Tanaka et al., "New Integrated Coding Schemes for Computer–Aided Facsimile," Proc. IEEE Int'l Conf. on Sys. Integration, Apr. 1990, pp. 275–281.
Tirkel et al., "Electronic Water Mark," DICTA–93, Macquarie University, Sydney, Australia, Dec., 1993, pp. 666–673.
Weber et al., "Correlative Image Registration," Seminars in Nuclear Medicine, vol. XXIV, No. 4, Oct., 1994, pp. 311–323.
Dautzenberg, "Watermarking Images," Department of Microelectronics and Electrical Engineering, Trinity College Dublin, 47 pages, Oct. 1994.
Szepanski, "Additive Binary Data Transmission for Video Signals," Conference of the Communications Engineering Society, 1980, NTG Technical Reports, vol. 74, pp. 343–351. (German text and English translation enclosed).
U.S. patent application Ser. No. 60/071,983, Levy, filed Jan. 20, 1998.
U.S. patent application Ser. No. 09/404,291, Levy, filed Sep. 23, 1999.
U.S. patent application Ser. No. 60/114,725, Levy, filed Dec. 31, 1998.
U.S. patent application Ser. No. 09/234,780, Rhoads et al., filed Jan. 20, 1999.
U.S. patent application Ser. No. 60/116,641, Cookson, filed Jan. 21, 1999.
U.S. patent application Ser. No. 09/478,713, Cookson, filed Jan. 6, 2000.
Cookson, Chris, General Principles of Music Uses on Portable Devices, presented to DSMI, Mar. 5, 1999.
Winogard, J.M., "Audio Watermarking Architecture for Secure Digital Music Distribution," a Proposal to the SDMI Portable Devices Working Group, by Aris Technologies, Inc., Mar. 26, 1999.
Mintzer et al., "Safeguarding Digital Library Contents and Users: Digital Watermarking," D–Lib Magazine, Dec. 1997, 12 pages.
U.S. patent application Ser. No. 09/765,102, Shaw, filed Jan. 17, 2001.
U.S. patent application Ser. No. 09/761,349, Rhoads, filed Jan. 16, 2001.
U.S. patent application Ser. No. 09/761,280, Rhoads, filed Jan. 16, 2001.
U.S. patent application Ser. No. 09/645,779, Tian et al., filed Aug. 24, 2000.
U.S. patent application Ser. No. 09/689,226, Brunk, filed Oct. 11, 2000.
U.S. patent application Ser. No. 09/689,250, Ahmed, filed Oct. 11, 2000.
U.S. patent application Ser. No. 09/689,293, Tian et al., filed Oct. 11, 2000.
U.S. patent application Ser. No. 09/625,577, Carr et al., filed Jul. 25, 2000.
U.S. patent application Ser. No. 09/574,726, Rhoads et al., filed May 18, 2000.
U.S. patent application Ser. No. 09/562,524, Carr et al., filed May 1, 2000.

U.S. patent application Ser. No. 09/498,223, Rhoads et al., filed Feb. 3, 2000.
U.S. patent application Ser. No. 09/465,418, Rhoads et al., filed Dec. 16, 1999.
U.S. patent application Ser. No. 09/431,990, Rhoads, filed Nov. 3, 1999.
U.S. patent application Ser. No. 09/428,359, Davis et al., filed Oct. 28, 2000.
U.S. patent application Ser. No. 09/342,972, Rhoads, filed Jun. 29, 1999.
U.S. patent application Ser. No. 09/293,602, Rhoads, filed Apr. 15, 1999.
U.S. patent application Ser. No. 09/293,601, Rhoads, filed Apr. 15, 1999.
U.S. patent application Ser. No. 09/287,940, Rhoads, filed Apr. 7, 1999.
U.S. patent application Ser. No. 09/185,380, Davis et al., filed Nov. 3, 1998.
U.S. patent application Ser. No. 09/074,034, Rhoads, filed May 6, 1998.
U.S. patent application Ser. No. 09/127,502, Rhoads, filed Jul. 31, 1998.
U.S. patent application Ser. No. 60/198,138, Alattar, filed Apr. 16, 2000.
*Audio Watermarking Architectures for Secure Digital Music Distribution. A Proposal to the SDMI Portable Devices Working Group* by ARIS Technologies, Inc, Mar. 26, 1999, pp. 1–11.
*Audio Watermarking Architectures for Persistent Protection, Presentation to SDMI PDWG.* Mar. 29, 1999, J. Winograd, Aris Technologies, pp. 1–16.
*Audio Watermarking System to Screen Digital Audio Content for LCM Acceptance, A Proposal Submitted in Response to PDWG/G99050504–Transition CfP* by ARIS Technologies, Inc., May 23, 1999, Document Version 1.0, 15 pages.
Boland et al., "Watermarking Digital Images for Copyright Protection", *Fifth Int'l Conference on Image Processing and it's Application,* Jul. 1995, pp. 326–330.
Levy, "AIPL's Proposal for SDMI: An Underlying Security System" (slide presentation), Mar. 29, 1999, 23 slides.
*Microsoft Response to CfP for Technology Solutions to Screen Digital Audio Content for LCM Acceptance,* SDMI, PDWG Tokyo, May 23, 1999, 9 pages.
*Response to CfP for Technology Solutions to Screen Digital Audio Content for LCM Acceptance,* NTT Waveless Radio Consotium, May 23, 1999, 9 pages.
Sandford II et al., "The Data Embedding Method", *Proceedings of the SPIE* vol. 2615, pp. 226–259, 1996.
Thomas, Keith, *Screening Technology for Content from Compact Discs,* May 24, 1999, 11 pages.
Tirkel et al., "Electronic Water Mark," *Dicta–93,* Marquarie University, Sydney, Australia, Dec., 1993, pp. 666–672.
Vidal et al., "Non–Noticeable Information Embedding in Color Images: Marking and Detection", *IEEE* 1999, pp. 293–297.
Wolfgang et al., "A Watermark for Digital Images," *Computer Vision and Image Processing Laboratory, Purdue University,* Sep. 1996, pp. 219–222.
"Access Control and COpyright Protection for Images, WorkPackage 8: Watermarking," Jun. 30, 1995, 46 pages.
"Access Control and COpyright Protection for Images, WorkPackage 3: Evaluation of Existing Systems," Apr. 19, 1995, 68 pages.
"Access Control and COpyright Protection for Images, WorkPackage 1: Access Control and Copyright Protection for Images Need Evaluation," Jun., 1995, 21 pages.
"Access Control and COpyright Protection for Images, Conditional Access and Copyright Protection Based on the Use of Trusted Third Parties," 1995, 43 pages.
Arachelian, "White Noise Storm," Apr. 11, 1994, Internet reference, 13 pages.
Arazi, et al., "Intuition, Perception, and Secure Communication," IEEE Transaction Systems, Man, and Cybernetics, vol. 19, No. 5, Sep./Oct. 1989, pp. 1016–1020.
Arthur, "Digital Fingerprints Protect Artwork," New Scientists, Nov. 12, 1994, p. 24.
Aura, "Invisible Communication," Helsinki University of Technology, Digital Systems Laboratory, Nov. 5, 1995, 13 pages.
Bender et al., "Techniques for Data Hiding," Draft Preprint, Private Correspondence, dated Oct. 30, 1995.
Bender et al., "Techniques for Data Hiding," Massachusetts Institute of Technology, Media Laboratory, Jan. 1995, 10 pages.
Boneh, "Collusion–Secure Fingerprinting for Digital Data," Department of Computer Science, Princeton University, 1995, 31 pages.
Boney et al., "Digital Watermarks for Audio Signals," Proceedings of Multimedia '96, 1996 IEEE, pp. 473–480.
Boucqueau et al., Equitable Conditional Access and Copyright Protection for Image Based on Trusted Third Parties, Teleservices & Multimedia Communications, 2nd Int. Cost 237 Workshop, Second International Cost 237 Workshop, Nov., 1995; published 1996, pp. 229–243.
Brassil et al., "Hiding Information in Document Images," Nov., 1995, 7 pages.
Brown, "S–Tools for Windows, Version 1.00, .COPYRGT. 1994 Andy Brown, What is Steganography," Internet reference, Mar. 6, 1994, 6 pages.
Bruyndonckx et al., Neural Network Post–Processing of Coded Images Using Perceptual Masking, 1994, 3 pages.
Bruyndonckx et al., "Spatial Method for Copyright Labeling of Digital Images," 1994, 6 pages.
Burgett et al., "A Novel Method for Copyright Labeling Digitized Image Data," requested by e–mail from author (unavailable/password protected on IGD WWW site); received Sep. 18, 1995, 12 pages.
Caromi, "Assuring Ownership Rights for Digital Images," Published in the Proceedings of 'Reliable IT Systems,' VIS '95, HH. Bruggemann and W. Gerhardt–Hackl (Ed.), Vieweg Publishing Company, Germany, 1995, Jun. 14, 10 pages.
Caruso, "Digital Commerce, 2 plans for watermarks, which can bind proof of authorship to electronic works." New York Times, Aug. 7, 1995, one page.
Castro et al., "Registration of Translated and Rotated Images Using Finite Fourier Transforms," IEEE Transactions on Pattern Analysis and Machine Intelligence, vol. PAMI–9, No. 5, Sep. 1987, pp. 700–703.
Choudhury, et al., "Copyright Protection for Electronic Publishing over Computer Networks," IEEE Network Magazine, Jun. 1994, 18 pages.
Clarke, "Invisible Code Tags Electronic Images," Electronic Engineering Times, Jun. 12, 1995, n. 852, p. 42.
"Copyright Protection for Digital Images, Digital Fingerprinting from FBI," Highwater FBI brochure, 1995, 4 pages.

"The Copyright Can of Worms Opened Up By The New Electronic Media," Computergram Internations, pCGN07170006, Jul. 17, 1995 and "The Copyright Can of Worms Opened Up By the New Electronic Media—2," Computergram Internations, pCGN07210008, Jul. 21, 1995, 3 pages total.

Cox et al., "Secure Spread Spectrum Watermarking for Multimedia," NEC Research Institute Technical Report, Dec. 5, 1995, 33 pages.

Cox et al., "A Secure, Imperceptable Yet Perceptually Salient, Spread Spectrum Watermark for Multimedia," IEEE, Southcon/96, Conference Record, pp. 192–197, 1996.

"Cyphertech Systems: Introduces Digital Encoding Device to Prevent TV Piracy," Hollywood Reporter, Oct. 20, 1993, p. 23.

Delaigle et al., "Digital Watermarking," Proc. SPIE—Int. Soc. Opt. Eng., vol. 2659, pp. 99–110, 1996.

Delaigle et al., "A Psychovisual Approach for Digital Picture Watermarking," 1995, 20 pages.

DICE Digital Watermark System, Q&A, Dec., 1995, 12 pages.

Digimarc presentation at RSA Conference, approximately Jan. 17, 1996, 4 pages.

Fimmerstad, "The Virtual Art Museum," Ericsson Connexion, Dec., 1995, pp. 29–31.

Fitzgerald, "Invisible Digital Copyright ID," Editor & Publisher, Jun. 25, 1994, p. 62.

"Foiling Card Forgers With Magnetic 'Noise,'" Wall Street Journal, Feb. 8, 1994.

Frequently Asked Questions About Digimarc Signature Technology, Aug. 1, 1995, HTTP://WWW.DIGIMARC.COM, 9 pages.

Friedman, "The Trustworthy Digital Camera: Restoring Credibility to the Photographic Image," IEEE Transactions on Consumer Electronics, vol. 39, No. 4, Nov., 1993, pp. 905–910.

Gabor, et al., "Theory of Communication," J. Inst. Elect. Eng. 93, 1946, pp. 429–441.

Hartung et al., Digital Watermarking of Raw and Compressed Video, Proc. SPIE 2952, Digital Compression Technologies and Systems for Video Communications, Oct., 1996, pp. 205–213.

Hecht, "Embedded Data Glyph Technology for Hardcopy Digital Documents," SPIE vol. 2171, Feb. 1994, pp. 341–352.

"Holographic signatures for digital images," The Seybold Report on Desktop Publishing, Aug. 1995, one page.

Humphrey, "Stamping Out Crime," Hollywood Reporter, Jan. 26, 1994, p. S48.

Jain, "Image Coding Via a Nearest Neighbors Image Model," IEEE Transactions on Communications, vol. COM–23, No. 3, Mar. 1975, pp. 318–331.

Johhnson, "Steganography," Dec. 10, 1995, 32 pages.

JPEG Group's JPEG Software (release 4), FTP.CSU-A.BEREKELEY.EDU/CYPHERPUNKS/APPLICATIONS/JSTEG/JPEG.ANNOUNCEMENT.GZ.

Kassam, Signal Detection in Non–Gaussian Noise, Dowden & Culver, 1988, pp. 1–96.

Koch et al., "Digital Copyright Labeling: Providing Evidence of Misuse and Tracking Unauthorized Distribution of Copyrighted Materials," Oasis Magazine, Dec. 1995, 3 pages.

Luc, "Analysis of Spread Spectrum System Parameters for Design of Hidden Transmission," Radioengineering, vol. 4, No. 2, Jun. 1995, pp. 26–29.

Machado, "Announcing Stego 1.0a2, The First Steganography Tool for the Macintosh," Internet reference, Nov. 28, 1993, 3 pages.

Macq, "Cryptology for Digital TV Broadcasting," Proceedings of the IEEE, vol. 83, No. 6, Jun. 1995, pp. 944–957.

Matthews, "When Seeing is Not Beleiving," New Scientists, Oct. 16, 1993, pp. 13–15.

Matsui et al., "Video–Steganography: How to Secretly Embed a Signature in a Picture," IMA Intellectual Property Project Proceedings, Jan. 1994, vol. 1, Issue 1, pp. 187–205.

Mintzer et al., "Toward on–line, Worldwide Access to Vatican Library Materials," IBM J. Res. Develop. vol. 40 No. 2, Mar., 1996, pp. 139–162.

Moller, et al., "Rechnergestutzte Steganographie: Wie sie Funktioniert warum folglich jede Reglementierung von Verschlusselung unsinnig ist," DuD, Datenschutz und Datensicherung, Jun. 18, 1994 318–326.

"NAB—Cyphertech Starts Anti–Piracy Broadcast Tests," Newsbytes, NEW03230023, Mar. 23, 1994.

Nakamura et al., "A Unified Coding Method of Image and Text Data Using Discrete Orthogonal Transform," Systems and Computers in Japan, vol. 21, No. 3, 1990, pp. 87–92.

Nakamura et al., "A Unified Coding Method of Dithered Image and Text Data Using Micropatterns," Electronics and Communications in Japan, Part 1, vol. 72, No. 4, 1989, pp. 50–56.

New Product Information, "FBI at AppleExpo" (Olympia, London), Nov., 1995, 2 pages.

Ohnishi et al., Embedding a Seal into a Picture Under Orthogonal Wavelet Transform, Proceedings of Multimedia '96, 1996, IEEE, pp. 514–421.

ORuanaidh et al, "Watermarking Digital Images for Copyright Protection," http://www.kalman.mee.tcd.ie/people/jjr/eva.sub.—pap.html, Feb. 2, 1996, 8 pages. (Also published Aug., 1996, IEE Proceedings–Vision, Image and Signal Processing, vol. 143, No. 4, pp. 250–256).

Pennebaker et al., JPEG Still Image Data Compression Standard, Chapter 3,, "Aspects of the Human Visual System," pp. 23–27, 1993, Van Nostrand Reinhold, New York.

Pickholtz et al., "Theory of Spread–Spectrum Communications—A Tutorial," Transactions on Communications, vol. COM–30, No. 5, May, 1982, pp. 855–884.

Pitas et al., "Applying Signatures on Digital Images," IEEE Workshop on Nonlinear Image and Signal Processing, Neos Marmaras, Greece, pp. 460–463, Jun., 1995.

Port, "Halting Highway Robbery on the Internet," Business Week, Oct. 17, 1994, p. 212.

Roberts, "Picture Coding Using Pseudorandom Noise," IRE Trans. on Information Theory, vol. 8, No. 2, Feb., 1962, pp. 145–154.

Sapwater et al., "Electronic Copyright Protection," Photo>Electronic Imaging, vol. 37, No. 6, 1994, pp. 16–21.

Schneier, "Digital Signatures, Cryptographic Algorithms Can Create Nonforgeable Signatures for Electronic Documents, Making Them Valid Legal Instruments" BYTE, Nov. 1993, pp. 309–312.

shaggy@phanton.com, "Hide and Seek v. 4.0," Internet reference, Apr. 10, 1994, 3 pages.

Short, "Steps Toward Unmasking Secure Communications," International Journal of Bifurcation and Chaos, vol. 4, No. 4, 1994, pp. 959–977.

Simmons, "Subliminal Channels; Past and Present," ETT, vol. 5, No. 4, Jul.–Aug. 1994, pp. 45–59.

Sheng et al., "Experiments on Pattern Recognition Using Invariant Fourier–Mellin Descriptors," Journal of Optical Society of America, vol. 3, No. 6, Jun., 1986, pp. 771–776.

Sklar, "A Structured Overview of Digital Communications—a Tutorial Review—Part I," IEEE Communications Magazine, Aug., 1983, pp. 1–17.

Sklar, "A Structured Overview of Digital Communications—a Tutorial Review—Part II," IEEE Communications Magazine, Oct., 1983, pp. 6–21.

"Steganography," Intellectual Property and the National Information Infrastructure The Report of the Working Group on Intellectual Property Rights, Sep. 1995, pp. 212–213.

Tanaka et al., "Embedding Secret Information Into a Dithered Multi–Level Image," Proc. IEEE Military Comm. Conf., Sep. 1990, pp. 216–220.

Tanaka, "Embedding the Attribute Information Into a Dithered Image," Systems and Computers in Japan, vol. 21, No. 7, 1990, pp. 43–50.

Tirkel et al., "A Two–Dimensional Digital Watermark," 1995, 6 pages.

Toga et al., "Registration Revisited," Journal of Neuroscience Methods, 48 (1993), pp. 1–13.

van Schyndel et al., "Towards a Robust Digital Watermark," ACCV '95, vol. 2, Dec., 1995, pp. 504–508.

Wagner, "Fingerprinting," 1983 IEEE, pp. 18–22.

Walton, "Image Authentication for a Slippery New Age," Dr. Dobb's Journal, Apr. 1995, pp. 18–26, 82–87.

"Watermarking & Digital Signature: Protect Your Work!" Published on Internet 1996, http://Itswww.epfl.ch/.about/jordan/watermarking.html.

Wise, "The History of Copyright, Photographers' Rights Span Three Centuries," Photo>Electronic Imaging, vol. 37, No. 6, 1994.

van Schyndel et al., "A Digital Watermark," IEEE International Conference on Image Processing, Nov. 13–16, 1994, pp. 86–90.

Zhao et al., "Embedding Robust Labels Into Images for Copyright Protection," Proc. of the International Congress on Intellectual Property Rights for Specialized Information, Knowledge and New Technologies (Vienna, Austria) Aug. 21–25, 1995, 10 pages.

Bender, "Applications for Data Hiding," IBM Systems Journal, vol. 39, No. 3–4, pp. 547–568, 2000.

Gruhl et al., "Information Hiding to Foil the Casual Counterfeiter," Proc. 2d Information Hiding Workshop, LNCS vol. 1525, pp. 1–15 (Apr. 15, 1998).

U.S. patent application Ser. No. 60/198,849, Apr. 21, 2000, Carr et al.

U.S. patent application Ser. No. 09/198,022, Rhoads, filed Nov. 23, 1998.

U.S. patent application Ser. No. 09/525,865, Davis et al., filed Mar. 15, 2000.

U.S. patent application Ser. No. 09/585,678, Ellingson, filed Jun. 1, 2000.

Pankanti et al., "Verification watermarks on fingerprint recognition and retrieval", SPIE vol. 3657, Jan. 1999.

Mintzer et al., "If One Watermark is Good, Are More Better?" 1999 IEEE, pp. 2067–2069.

Caruso, "Technology: Digital Commerce, 2 Plans for Watermarks, Which Can Bind Proof of Authorship to Electronic Works.", New York Times, one page, Aug. 7, 1995.

Friedman, "The Trustworth Digital Camera: Restoring Credibility to the Photographic Image" , IEEE Trans. On Consumer Electronics, vol. 39, No. 4, pp. 905–910, Nov. 1, 1993.

Knox, "Digital Watermarks Using Stochastic Screens", SPIE vol. 3018, pp. 316–322, Apr. 1, 1997.

Nakamura, "A Unified Coding Method of Dithered Image and Text Data Using Micropatterns", Electronics and Communications in Japan, Part 1, vol. 72, No. 4, pp. 50–56, Jan. 1, 1989.

Seybold Report on Desktop Publishing, "Holographic Signatures for Digital Images", one page Aug. –95.

Yeung "Digital Watermarks: Shedding Light on the Invisible", IEEE Computer, pp. 32–41, Nov. 1, 1998.

* cited by examiner

AUTHENTICATION WATERMARKS FOR PRINTED OBJECTS AND RELATED APPLICATIONS

RELATED APPLICATION DATA

This patent application is a continuation in part of U.S. patent application Ser. No. 09/625,577, entitled Authenticating Objects Using Embedded Data, filed on Jul. 25, 2000 by Scott Carr and Burt Perry, which is hereby incorporated by reference.

The subject matter of the present application is related to that disclosed in U.S. Pat. No. 5,862,260, and in co-pending application Ser. No. 09/503,881, filed Feb. 14, 2000; which are hereby incorporated by reference.

TECHNICAL FIELD

The invention relates to methods for authenticating objects, and in particular, relates to methods for embedding security data into products, and methods for authenticating these products using the embedded security data.

BACKGROUND AND SUMMARY

Counterfeiting and piracy have a huge economic impact. While numerous product security features have been developed, there remains a demand for cost effective security measures that inhibit counterfeiting and piracy.

Research in the field of steganography (also called "data hiding") offers promising technology for combating counterfeiting and piracy. One form of steganography is referred to in popular literature as digital watermarking. Digital watermarking is a process for modifying a host signal or object to embed a machine-readable code into the host. The host may be modified such that the embedded code is imperceptible or nearly imperceptible to the ordinary observer upon viewing or playback, yet may be detected through an automated detection process.

Most commonly, digital watermarking is applied to media such as images, audio signals, and video signals. However, it may also be applied to other types of media, including documents (e.g., through subtle line, word or character shifting), software, multi-dimensional graphics models, and surface textures of objects.

The invention relates to methods for authenticating printed objects using digital watermarks embedded in the images on the objects. One aspect of the invention is a system for authenticating a printed object. The system includes a watermark decoder and a verification module. The watermark decoder detects a copy detection watermark in a printed object to determine whether the printed object has been reproduced. The verification module processes a message decoded from an authentication watermark on the printed object to authenticate the printed object or bearer of the printed object. The authentication and copy detection watermarks may be implemented as the same or different watermarks. For example, the copy detection watermark may be a fragile watermark that carries the message and that degrades in response to a reproduction operation, such as photocopying or scanning and then re-printing the object. Alternatively, the authentication and copy detection watermarks may be separate watermarks embedded in an image that is printed on the object. The authentication watermark, in some applications, includes an identifier that links the object to a database entry with related information about the object. This related information can be used to check the bearer of the object by comparing it with attributes of the bearer (such as a user ID or photo) or the validity of the object by comparing it with attributes that are visible or machine readable on the object.

Another aspect of the invention is a system for creating a printed object. The system includes a watermark encoder and communication application. The watermark encoder encodes a watermark in an image to be printed on a printed object. This watermark is used to authenticate the printed object. The communication application obtains an identifier from a database for embedding into a message payload of the watermark. It also provides to the database information to be associated with the identifier.

Further features will become apparent with reference to the following detailed description and accompanying drawings.

DETAILED DESCRIPTION

Introduction

The following sections describe a system and related methods for authenticating products. While the description illustrates the system with an example of packaged software product, it applies to a variety of types of objects. In this document, the term "product" broadly encompasses physical objects (e.g., goods), and other objects associated with them like packaging, tags, labels, documentation, and media supplied on, by, or with the object. Within this broad product context, the embedding process may encode security data on any of these types of products. To determine whether a product is authentic, the methods and systems described in this document can be used to evaluate security data embedded on the product itself, its packaging, labels, tags, media, etc. One implementation of these methods and secure products employs a form of steganography referred to as digital watermarking. However, other forms of steganography may be used as well. There are two principal parts of the product authentication architecture: 1) a system for embedding authentication data into the product; and 2) a system for authenticating the product.

Typically, product makers assign unique identifiers, such as product serial numbers, to each product. In the product security systems describe below, an embedder encodes the serial number as a form of machine readable security data into the product or its packaging. This embedded security data is then used to authenticate the product and/or control unauthorized use. In the case of software products, for example, the embedded security data may be used to ensure that the user is authorized during installation of the software on the user's machine. In the case of financial or access cards (e.g., debit/credit cards, key cards, corporate badges), the embedded security data may be used to activate the card. In the more general case, the embedded security data may be used to check whether a product is authentic by validating a conspicuous product identifier, such as a visible serial number, with one imperceptibly embedded in the product or its packaging. These systems are detailed further below.

Embedding Security Data Into a Product

Figure 1:
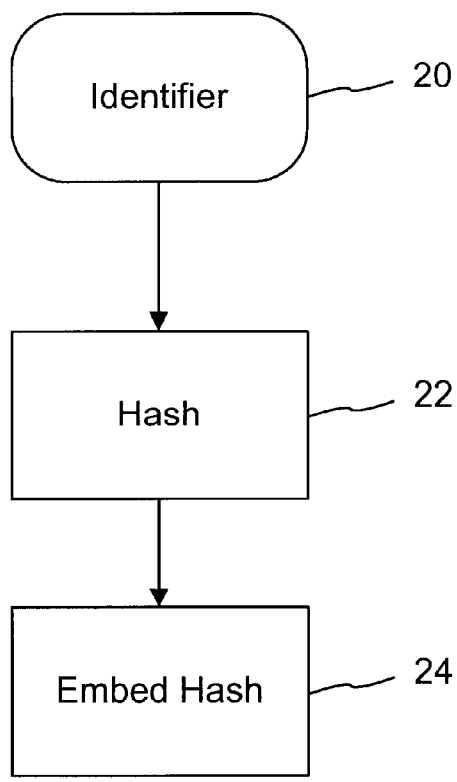
FIG. 1 is a flow diagram illustrating a method for embedding an object identifier into an object.

FIG. 1 is a flow diagram illustrating a method for embedding security data into a product. The maker or distributor of the product assigns a unique identifier, such as a serial number, to the product. The embedding process takes this identifier 20 and transforms it into a form of data for embedding in the product or its packaging. While the identifier need not be modified before embedding it, there are a number of reasons for doing so. One reason is to convert it into a more compact form for embedding. Another reason is to make the embedded data more secure, i.e. more difficult for counterfeiters or pirates to replicate.

FIG. 1 depicts an example of a data conversion method called a hash 22. The hash is a function that converts the identifier into another number. One form of hash is a checksum, but there are many others. One example of a checksum is one that converts a number or set of numbers (e.g., serial number, product code, etc.) into another number using a sequence of prime numbers. A cryptographic hash may be used to generate a new number from which the original identifier is difficult to derive. Whether hashed or not, the data to be embedded is referred to as "security data."

The embedding process embeds the security data into a machine readable code on the product or its packaging (24). In particular, the process steganographically embeds the security data into the machine readable code on the product or on packaging or labels for the product. A steganographic process embeds information on the product's surface such that is imperceptible or substantially imperceptible upon ordinary inspection, yet readable by machine.

One form of steganography is called digital watermarking. A variety of digital watermarking schemes may be used to embed the watermark onto the print media. Some example watermark encoding and decoding schemes are provided in U.S. Pat. No. 5,862,260, and in co-pending application Ser. No. 09/503,881, filed Feb. 14, 2000.

In digital watermarking of images printed on physical objects, there is a tradeoff between visual perceptibility and survivability of the watermark. In this application, the watermark is embedded so as to be sufficiently robust to survive analog to digital conversion, digital to analog conversion, and possible other forms of corruption, including geometric distortion, additive noise, and compression. The watermark may be encoded by altering the luminance or one or more other color channels of an image printed on the surface of the product. Alternatively, the watermark may be encoded using clear inks that modulate the microtopology of the product's surface or that are readable when exposed to light in non-visible wavelengths, like UV or infrared. Also, the microtopology of the product surface may be altered in the process of creating the product surface so as to embed a watermark. Alternative machine readable codes may be used as well, such as data glyphs, invisible bar codes, etc.

A digital watermark embedding process typically involves several operations. For example, additional data may be appended to the security data, such as synchronization symbols, error detection codes, etc. After adding this data, the security data includes a sequence of symbols for embedding into the product. Additional operations include error correction and other forms of symbol encoding (e.g., convolution codes, turbo codes, BCH codes, Reed Solomon encoding, M sequences, gold sequences, etc.). These operations transform the original message sequence into a message signal. The message signal may then be further replicated and modulated using spread spectrum modulation techniques. For example, the message signal may be spread over a pseudorandom number or set of pseudorandom numbers and repetitively scattered throughout a host signal.

The host signal (sometimes referred to as the cover signal) is the signal in which the embedded data is hidden. This might be an image printed on an object, label or package, a layer of visible or invisible inks, line art, text, surface topology of an object, etc. The watermark signal may be replicated in several different contiguous or overlapping regions of the host signal. Each instance of the watermark at these regions can be associated with a corresponding imperceptible watermark template, synchronization or orientation signal that enables the decoder to detect the presence of the watermark and determine its orientation parameters such as translation (x, y coordinates of an origin), rotation, scale, shear, differential scale, etc.

To embed the message signal, an embedding function subtly changes the host signal. Digital watermarks usually operate on a digital form of the host signal to create a digital watermarked signal, which is then converted to analog form. However, the digital watermark may also be applied in the analog domain. A variety of embedding functions have been detailed in the literature about digital watermarking. These functions may be additive, multiplicative (adding or multiplying a message signal with the host signal), or some other function, such as a non-linear quantization function. The quantization function embeds a message symbol (e.g., binary or M-ary) by quantizing a sample value or a characteristic of a set of sample values of the host signal to a quantization level associated with the symbol being encoded. To decode the symbol, the watermarked signal is captured and evaluated (e.g., re-quantized) to determine which quantization level a sample or characteristic of a set of samples most closely corresponds to. This quantization level is then mapped to the corresponding symbol.

The embedding functions may be applied to image samples or characteristics in the spatial domain or some transform domain, like Discrete Cosine Transform, Discrete Wavelet Transform, Discrete Fourier Transform, etc.

For enhanced security, various elements of the embedded data may be encrypted. Some or all of the watermark message, including the security data in the message may be encrypted. Various keys used to encode the watermark may be encrypted as well. For example, a key that defines the location of the watermark signal in the host signal may be encrypted. A key used to decode the spread message signal (e.g., a pseudorandom number) may also be encrypted.

In implementations where instances of the watermark signal are repeated in the host signal, a key in the message payload of one instance of a watermark signal may be used to decrypt a message, such as the security data, in other instance of the watermark signal. The key may be included in a message payload by appending the key to the message or combining it with the message using some function such as an XOR, or multiplication operation that combines the key with the message to create a composite message.

Keys used to decode the watermark or its message payload may also be derived from the host signal itself or from another watermark in the host signal.

Digital watermarks provide a low cost, yet secure method of embedding security data into a product or its packaging. The embedding process can be integrated into the process of printing the object or its packaging. For example, for each product, the printing process may be adapted to print an image embedded with the product's identifier or hashed form of it. This process may be integrated in the mass production of a variety of printable objects, like packaging, containers, labels, product documentation, credit cards, etc.

Authenticating A Product Using Embedded Security Data

Figure 2:
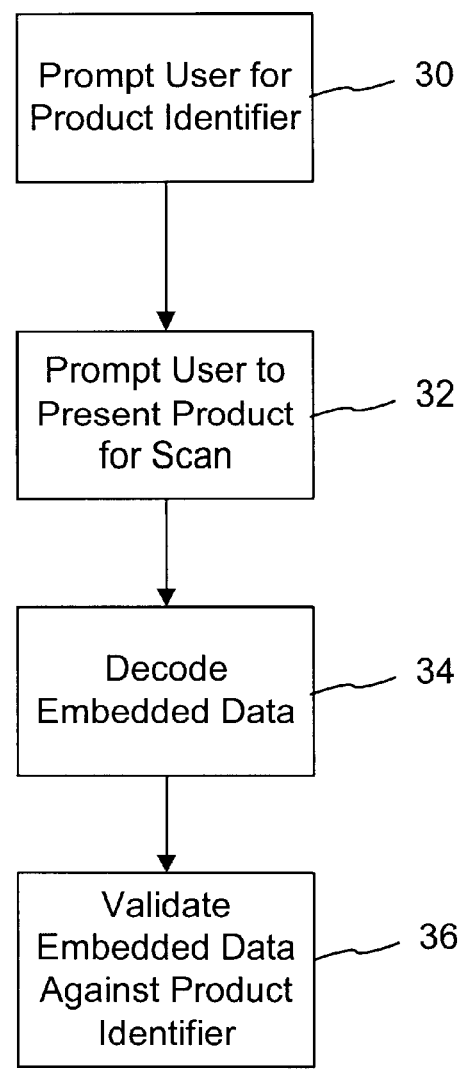
FIG. 2 is a flow diagram illustrating a method for authenticating an object using the embedded object identifier.

FIG. 2 is a flow diagram illustrating a process for authenticating a product using embedded security data. The authentication system includes a user interface, scanner and embedded data decoder. In the case where the embedded data is encoded in a digital watermark, the system may be implemented in a personal computer equipped with an imaging device, such as a CCD camera or scanner.

Authentication begins by prompting the user for the product identifier (30). Typically, this identifier is a product serial number in plain view on the product, its packaging or documentation. The user may enter the product number by simply typing it on a keyboard, or using some other user input device (voice recognition, bar code scanner, etc.) In response to receiving the product identifier, the system prompts the user to present the product for scanning (32). The user then scans the product with a sensor device, such as a CCD camera, to capture a product scan.

Next, the system decodes the embedded data from the product scan (34). In the case of security data embedded in digital watermark on the product, the system scans one or more image frames of the product. It then proceeds to detect the watermark in this image signal. Finding a watermark, it decodes the watermark message, including any security data.

To validate the security data (36), the authentication system re-computes the security data from the product identifier entered by the user. It then compares the computed security data with the decoded security data. If the two sets of security data match, then the system deems the product to be valid.

A variety of actions may be triggered by the outcome of the validation process 36. One action is to convey the output of the validation process to the user via a user interface, such as audio output, graphical user interface, etc. This type of operation could be used to authenticate any type of product using an authentication system implemented in a personal computer with an image sensor and software for executing the authentication operations.

In the case of a software product, the validation process (36) can automatically launch installation of the software on the user's computer. A variety of additional post-validation actions may be triggered automatically, such as establishing a connection to another computer (e.g., web server) to facilitate on line registration of the product, downloading of additional software or other content, retrieval of one or more keys that enable the software's operation, etc.

The same actions also apply to other types of products that execute machine instructions from a machine readable memory device. For example, hardware devices with embedded software or firmware could be authenticated in a similar fashion. In particular, the user would enter a product number into a user interface of the device, or another device in communication with it (a nearby PC connected via a wire or wireless port-USB, Firewire, Bluetooth, Infrared link, etc.). The user interface then would prompt the user to scan the product with a camera connected directly to the device being authenticated or indirectly through another device (e.g., the nearby PC). An embedded data decoder would then detect and decode any security data and take actions triggered by the result of the validation process. One action would be to install software to the device being authenticated from a nearby device or computer network. Another action would be to load one or more keys or other instructions that enable functionality of the device being authenticated.

The application of the authentication system to the registration and installation of software and embedded systems may be extended more generally to many forms of digital content, such as software, music, movies, games, etc. In each of these applications, the authentication method and system is similar. The digital content being authenticated may be packaged on a variety of storage media, such as an optical disk, magnetic disk, flash memory card, etc. The storage media or its packaging (e.g., a DVD case) includes embedded security data that is readable by machine and that is validated against a product identifier. The validation process may trigger actions relating to the digital content stored on the storage medium, such as control rendering of the content, control transfer of the content from the storage medium to another device, control usage of the content (e.g., number of copies, transfers, etc. allowed), linking to a network to retrieve related information or actions (e.g., linking to a product web site to get more information, license rights or purchase products or services).

The method depicted in FIG. 2 is also applicable to activation of financial and access cards like credit/debit cards, card keys, corporate badges that include keys for accessing buildings, computer systems (including access to a single machine or access to network resources), etc. To illustrate this application, consider an implementation of the authentication system on a network. First, the user receives a new card along with an identifier. This identifier might be one printed conspicuously on the card or given to the user separately (e.g., such as a corporate personnel number). The user enters this identifier and scans the card with an image sensor (e.g., a PC camera, flatbed scanner, etc.) An embedded data decoding process extracts security data, if any, from the scanned image, and validates it against the data entered by the user. If the embedded data is valid, then the authentication system activates the card.

While the system for activating cards can be implemented on a stand alone computer system, it may be more commonly implemented in a network configuration. The system might be implemented in a client server architecture where a client computer at the user's location performs object scanning and decoding functions, and the server at a remote location validates the embedded data against data supplied by the user. The locations of computer processes that perform the various card activation operations (prompting for user input, scanning, decoding and validation) can be distributed between the client and one or more server computers.

The process of validating a product identifier with embedded security data can be extended in various ways. The embedded data and product identifier entered by the user may be used to form a key to decrypt data supplied in or by the product (e.g., software or multimedia content stored on a CD, DVD, etc.). In this case, the data supplied in or by the product is encrypted and the embedded data is used to convey one element of the key. Other elements of the key may be a product identifier, such as a serial number on the product, and a password of the user. Typically, the data supplied in the product is encrypted by the publisher when the product is made (e.g., burning of a CD, DVD, etc.). However, the encryption and security data embedding processes may be performed whenever data is transferred onto the product (e.g., transfer of data onto a writable storage device).

An additional enhancement is to use the cryptographic key formed from the embedded data and the user entered data (e.g., product identifier, password, etc.) to decrypt yet another key. This additional key can then be used to decrypt content supplied on or by the product. The product may be a storage device such as optical disk, magnetic storage device, flash memory, etc. that carries encrypted data, or some other type of device that supplies encrypted content.

Some examples of such devices are receivers of scrambled content like computers, set-top boxes, personal digital assistants, audio and video players, etc. Consider an example where a user wishes to watch a pay per view movie. The cable provider distributes promotional cards that enable the card holder to access the movie. To access the movie, which is provided in encrypted form via a set-top box or other cable receiver, the user displays the card to a camera connected to the set-top box through a wire or wireless connection. The set-top box decodes embedded security data on the card and combines it with other user and/or product information, such as the user's password, set-top box serial number, card number printed on the card, etc. to form a decryption key that is used to decrypt the movie, which streamed to the set-top box. A similar approach may be applied to other digital content that is downloaded or streamed in an encrypted form over a network, like the Internet, wireless phone network, cable television network, etc.

The security of the embedded data can be enhanced through the use of copy detection technology. Copy detection technology can be used to detect whether a counterfeiter has made a copy of the object bearing the embedded security data. For example, a counterfeiter might try to circumvent the authentication system by making a high quality copy of the image bearing the embedded security data using a scanner or copy machine, and then printing that image on a counterfeit product or its packaging.

The copy detection technology may be used to embed the security data (e.g., a watermark that is used to detect copying and convey security data) or may be separate from the security data (a separate watermark or other auxiliary data that is used to evince copying). One form of copy detection technology is a digital watermark that is altered in a predictable way when copied with a scanner, copy machine, or other imaging device. Such imaging devices apply a transformation to an image (e.g., an analog to digital sampling, color transformation, etc.) that can be detected by a watermark designed to change in a predictable way to such a transformation.

An example of copy detection technology is a "fragile" watermark. The watermark is called fragile because the strength of the watermark signal in a copy of the watermarked original object is less than the strength in the original object. To detect copying, the embedded data decoder attempts to detect the fragile watermark. If the fragile watermark is not present, or has a measured strength that falls below a threshold, then the decoder deems the object to be an invalid copy. There are a variety of ways to measure strength of a watermark signal. One way is to measure the extent of the correlation between an image of the suspect object and a reference fragile watermark signal.

Rather than using a separate fragile watermark, the authentication system may detect copying based on attributes of the watermark used to carry the embedded data. For example, the watermark may include a synchronization or orientation signal used to detect the presence of the watermark and determine its orientation. Copying of a watermarked object may be detected by measuring changes in the watermark orientation signal.

Since the watermark carrying the embedded data is made to survive distortion due to normal scanning operations required to read the watermark from an object, a fragile watermark may not accurately discern copying by a counterfeiter from these normal transformations. However, the watermark payload may be embedded in ways that survive these normal operations, yet still carries information from which copying can be discerned. For example, the payload of the watermark may be robustly encoded to withstand transformations due to scanning, geometric distortion, etc., yet convey information from which copying can be discerned.

One type of copy detection payload is an identifier that is related to some other characteristic of the object (another machine readable code, like a bar code, magnetic stripe, hologram, etc.).

Another form of copy detection is to scramble or encrypt part or all of the watermark payload in a predictable, yet different manner from one product to the next. This may be accomplished using a cryptographic hash that scrambles the payload using the product number or some other product specific attribute as a seed.

Another way is to scramble the location of the watermark or the relationship between different parts of the watermark using a cryptographic function. For example, the watermark may be replicated in blocks of an image, where each block encodes a similar payload, yet encodes that payload in a different manner based on a secret key. Each block may include an orientation signal that enables the decoder to properly align the image data for that block. In each block, the watermark payload may be scrambled differently, such as using a seed for a cryptographic scrambling function based on block location, block number, or data from the payload of another block, etc.

While the decoding process can use the orientation signal to align each block, it may not be able to discern the precise alignment of blocks in the scanned image relative to blocks in the original watermarked image. As such, the decoder may only be able to recover the relative location of blocks to each other, but not their absolute location in the original image. To address this challenge, the variation of the watermark or its payload across the image can be made in a relative manner from one block to the next using a secret key that defines the relationship between blocks. Relative changes between neighboring blocks enable the decoder to extract the payload from one block using information from one or more neighboring blocks. For example, the payload of one block may be altered using the payload of one or more adjacent blocks. The relationship between the payloads of adjacent blocks may be defined according to a cryptographic function. For example, the payload of one block may be used as a key to decoding an adjacent block.

A related enhancement is to use keys for decoding the watermark, the watermark payload, or digital content that are dependent on the host signal. This type of host signal dependent key makes it difficult to copy the embedded security data from one object to another. To illustrate this enhancement, consider embedded security data in an image watermark on a product, packaging, or label. One form of image dependent key is a key that is derived from a property of the image that is insensitive to the changes due to the watermark embedding process and recoverable in a watermark decoding operation on the embedded product.

An example of this type of key is a number that is derived from statistical properties of the image that are insensitive to the watermark embedding process, like the relative power differences between blocks of the image. The key could be, for instance, a binary number computed by comparing the power of a given block with a set of other blocks, such as those in a predetermined neighborhood around the given block. The comparison operations yield a one or zero depending on whether the power of the given block is greater or less than the selected neighbors. Each comparison operation yields a single bit in the key. The key may then be appended or combined with the watermark payload.

At the time of authentication, the watermark decoding process employs a synchronization or orientation signal to align the image data. Then it re-computes the image dependent key by repeating the key derivation operation as computed in the embedding process. The key computed at the time of decoding may be compared with the embedded key to check authenticity of the embedded data. Other properties that are insensitive to the watermark process may be used as well.

Another enhancement that can be used as a form of authentication and copy detection is to embed two or more different watermarks that have a known relationship with respect to each other. One such relationship is a predetermined offset in the spatial image domain, or some other transform domain, like a Discrete Fourier Transform, Discrete Cosine Transform, Discrete Wavelet Transform, or some re-sampling of one of these domains, like a log, log-log, or log-polar re-sampling. This known relationship changes in a predictable way when the watermarked object is copied. Thus, during the authentication process, a watermark decoding process detects the watermarks and computes this relationship between the watermarks. It then compares the computed relationship with the known relationship to determine whether some unauthorized transform likely occurred, such as copying.

One way to detect that a detect whether a printed object (e.g., a document, label, ticket, box) has been copied is to embed two watermark signals with different characteristics that change differently in response to reproduction operations such as photocopying, or digital scanning and re-printing. To differentiate a copy from an original, the watermark decoder measures the characteristics of both watermarks in a digital image scan of the printed object, and detects a copy by the changes in the watermarks attributable to reproduction operations. Examples of this approach are described in U.S. patent application Ser. No. 09/433,104, entitled Methods and Systems Using Multiple Watermarks, by Geoff Rhoads and Ammon Gustafson, which is hereby incorporated by reference. Four approaches are listed in this document, including:

1. high and low spatial resolution watermarks;
2. one watermark with a geometrically linear assignment of pixels and another with a random assignment of pixels;
3. low and high power watermarks; and
4. one watermark with standard a RGB to HIS—HSI to RGB transform and a second watermark that is biased before being transformed from HSI to RGB.

In the first case, the high resolution watermark is degraded more than the low resolution watermark. The watermark detector detects copying by measuring the change in the power ratio between the two watermarks in a suspect image relative to the original ratio, which is set at embedding and provided to the detector. In the other cases, the detector detects copying by observing changes in the relative strengths of the detected watermark signals with respect to the original relationship between the watermarks.

Similar techniques may be used to create a fragile watermark that evidences copying due to changes in the fragile watermark's strength relative to its original strength in the un-manipulated original printed object. Also, the fragile watermarks may be adapted to carry a message payload. Finally, the fragile watermarks may be spatially replicated in contiguous blocks of the image. The detector can then isolate the spatial location of blocks of the image where the fragile watermark or watermarks evidence tampering.

The above sections refer to encryption and decryption operations. A variety of cryptographic technologies may be used to implement these operations. Some examples of encryption technologies include RSA, DES, IDEA (International Data Encryption Algorithm), skipjack, discrete log systems (e.g., El Gamal Cipher), elliptic curve systems, cellular automata, etc.

The above sections also refer to hash operations and in some cases, cryptographic hashes. Cryptographic hashes are functions used to convert a first number into a relatively unique second number in a manner that makes it difficult to derive the first number from the second number. Examples of hashing functions include MD5, MD2, SHA, SHA1.

Watermark Embedding and Decoding System

Figure 3:
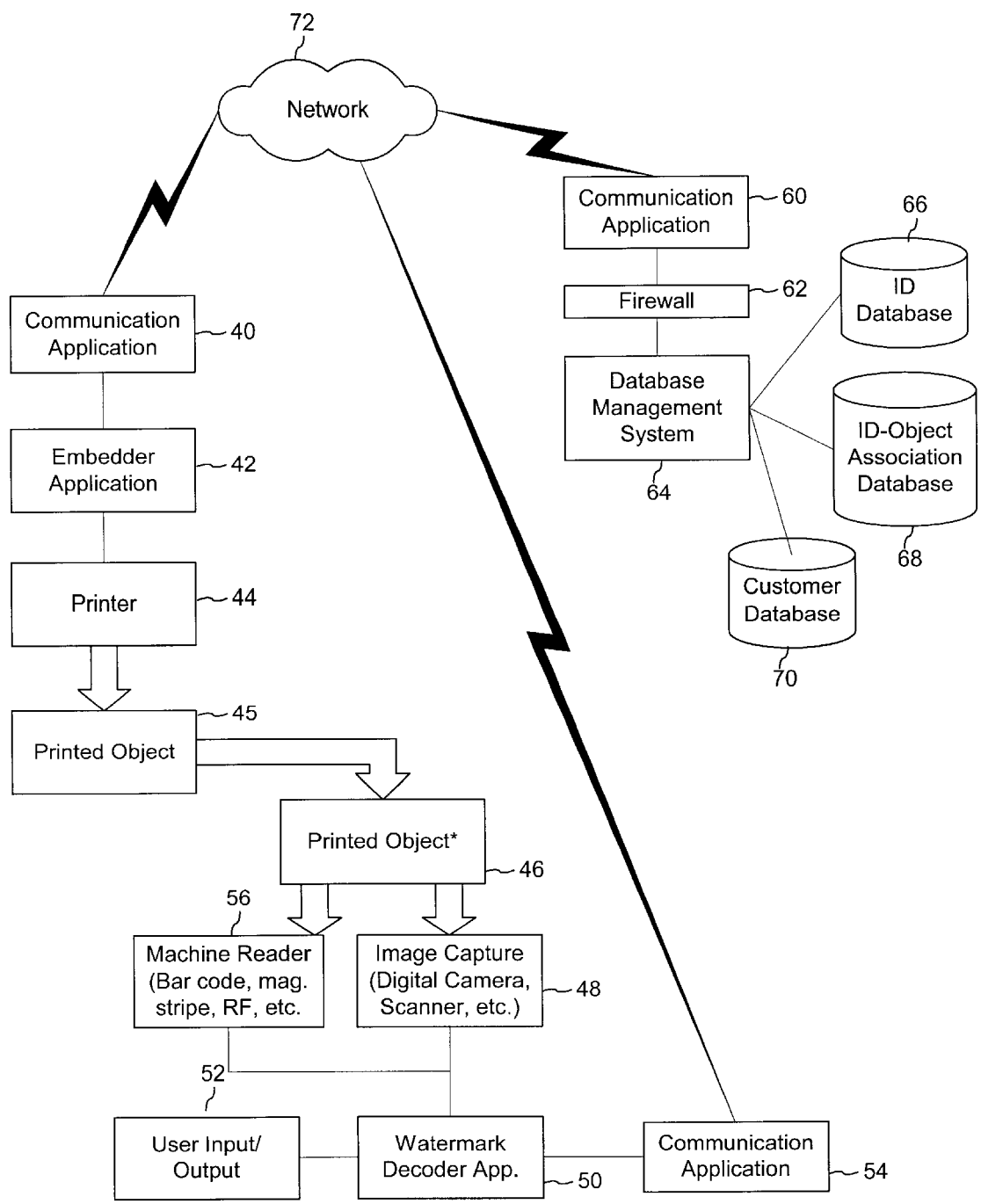
FIG. 3 is a diagram of a system architecture for creating and verifying the authenticity of printed objects using digital watermarks for copy detection and authentication.

FIG. 3 is a diagram illustrating a architecture for watermark embedding and decoding for printed objects. As described further below, this architecture applies to a variety of printed object types and application scenarios. Before discussing the various object types and applications, this section begins with a description of the system architecture. The implementer may adapt the system for a particular application using one more components of the architecture. Later sections describe a number of example application scenarios based on this architecture.

There are three primary components to the system: 1. a watermark embedding system (40–44) that embeds a digital watermark into an image and prints the watermarked image on an object 45 (e.g., document, card, label, tag, coupon, ticket, pass, security, certificate of authentication, etc.); 2. a watermark decoding and verification system that reads the watermark from a potentially manipulated version of the printed object 46 and verifies its authenticity (48–56); and a database system (60–70) that performs a variety of functions, depending on the application. These database functions include managing information embedded in the printed objects (e.g., identifiers), managing electronic transactions associated with assigning identifiers and using them in the printed objects, assisting in verification of the printed objects, and maintaining event logs and reports of object usage.

In FIG. 3, these three primary components are interconnected via a network 72 such as the Internet. However, the database functions can be built into the embedder and decoding systems to perform data management and data look up operations locally within those systems.

The embedding and decoding systems are implemented as software applications for an open hardware platform or as special purpose systems. Examples of an open platform implementation include a software application for an operating system like Microsoft Windows or Linux that end-user's install on a computing device with a connection to a network and printer (for embedding) or scanner or digital camera (for decoding and verification). Examples of a special purpose platform include a combined software and hardware system with a network connection (possibly a private network) and a special purpose printer for printing value documents, like boarding passes, tickets, coupons, financial or phone cards, etc. Both the embedding and decoding systems may be implemented in kiosk for public places like coffee shops, restaurants, airports, train stations, bus stations, etc. Such systems can be used for the printing of tickets, passes, coupons, etc., as well as in check in stations for tickets and passes or redemption stations for coupons.

Implemented as a software program or a combination of hardware and software, the embedder application 42 takes an image for printing on an object and embeds a digital watermark in the image comprising an array of sample values (halftone dots or multilevel per pixel samples). Preferably, the digital watermark is substantially imperceptible to a viewer of the image, but that is not a requirement in all applications. The embedder embeds a message payload into blocks of pixels of an image. Depending on the size of the image and the payload, the message payload may be replicated throughout the image several times to increase robustness. In certain applications, the embedder embeds an identifier into the message payload that is uniquely associated with a printed object or set of similar printed objects. This identifier may be used to identify the object, to link the printed object with information about it stored in a local or remote database, to act as a unit of value or link to a monetary value associated with the object (e.g., a ticket, a piece of postage, a pass, a coupon, etc.), to authenticate the object, to track the usage of the printed object (e.g., to monitor usage of a train or bus pass, to monitor redemption of coupons), etc.

The embedder may also embed into the watermark payload attributes of the image printed on the object, such as a perceptual hash of the image. In addition, it may embed attributes of the bearer of the object such as name, user ID number, age, etc. or other information into the watermark message payload. Also, it may embed text data that is printed on the object (like a document ID, etc.) into the watermark payload. In each case, the embedder may embed text or numeric data representing the attributes themselves, a hash of this data, or a losslessly compressed version of this data.

Additionally, the watermark payload may include a time stamp or a link to a time stamp in the database. This time stamp is usefull in verification operations to check the age of the printed object, and process the object according to its age. In some applications, like passes, tickets, debit cards, etc. the printed object becomes invalid and inoperable after a certain period elapses.

For verification, the decoding system derives these attributes from the printed object and compares them with the information in the watermark payload or in the database, which is referenced by the identifier in the watermark payload. A verification module performs the process of verifying authentication attributes derived from the object and elsewhere (e.g., from the database, from the user, etc.). This module may be located in the decoding system, a remote database, or distributed in both systems.

The watermark protocol defines the nature of the watermark signal and its payload. For example, the protocol specifies keys used to encode and decode the watermark, symbol coding schemes like error correction coding, M sequences and gold sequences, error detection schemes (convolution codes, Reed Solomon codes, BCH codes, etc.), spread spectrum modulation and associated spreading keys, synchronization codes, etc. The protocol may vary from one application to the next. The protocol may define a single robust watermark, a single fragile watermark, or some combination of fragile and robust watermarks. For example, the object may have a single fragile watermark (per image block). This fragile watermark may carry a payload, or simply act as a copy detection watermark that degrades when the printed object is reproduced in a photocopy machine or by scanning and re-printing. The object may have a single robust watermark (per image block) that carries a message payload. Alternatively, the object may include a robust watermark for carrying a message payload, and a fragile watermark that acts as a copy detection watermark. The robust and fragile watermarks may each be implemented as two or more different watermark signals. Also, the watermark signals may include attributes, such as a template, calibration signal or other characteristic features or patterns that are used to correct for geometric distortion in capturing an image of the object for watermark decoding. In some applications, it is useful to ascertain which portions of the object have been tampered with. One way to do this is to repeat a fragile watermark in spatial blocks of the image printed on the object. Then, in the decoding process, a watermark detector indicates which blocks have a detectable fragile watermark and which do not. Another approach is to embed a fragile watermark with a different message payload in each block. Then, in the decoding process the detector reports all of the fragile watermark payloads that it has successfully recovered. The missing payloads indicate the blocks that have been tampered with.

After embedding the watermark in the image, the embedder passes the watermarked image to the printer 44, which in turn, prints the image on an object to create the printed object 45. The watermark survives the transformation from a digital image to a physical printed object, and is typically spread over surface of the object (e.g., repeated in contiguous rectangular blocks throughout the object), which may carry other information, such as the host image in which the watermark is embedded as well as other markings and text. This object undergoes typical or malicious manipulation, such as wear and tear, soiling, crumpling, photocopying, scanning and re-printing, etc. To depict this manipulation, FIG. 3 graphically depicts the printed object 45 being transformed into a potentially altered version of the object 46 after manipulation.

The watermark decoding system includes an image capture device 48, watermark decoder application 50, and user input/output devices (like a keyboard, display, etc.). It may also include a machine reader 56 to read other machine readable codes from the object (2D or 1D bar code, a magnetic stripe, an RF tag, an integrated circuit chip carrying data about the object, organic transistor, etc.). The information conveyed in these other machine readable codes may be related to the information conveyed in the watermark payload (e.g., through a predetermined mathematical relationship such as one being the hash of the other) for authenticating the printed object.

The watermark decoder employs watermark detecting and reading technology described and referenced in this document to detect a fragile watermark if present, and to read the watermark payload if present. For more on watermark embedding, detecting and reading operations, see U.S. Pat. No. 5,862,260 and U.S. application Ser. No. 09/503,881, which is incorporated by reference. Depending on the implementation, the watermark decoder may perform one or more verification processes such as: checking for the presence of a fragile watermark or watermarks, measuring the strength of the watermark signal, or comparing the payload information with other verification information entered by the user, read automatically from other machine readable features on the document, printed on the face of the document or fetched from a database, etc. The decoder may also communicate watermark payload information to the database, or use the watermark payload information to look up additional authentication information in the database via a network connection.

The watermark detection and/or payload reading of one or more watermarks in the image may be based on user provided key information, such as a password, which may be combined with an image hash or other information on the object to provide a watermark detection key (e.g., a pseudorandom pattern) or a watermark payload descrambling or decoding key.

As detailed further below, the watermark may also link the printed object to a database entry storing information about the user. The decoding system or database compares the user information in the database entry with that supplied by the user to verify that the printed object is being presented for verification by the proper user. This feature is useful to verify that certain types of items, like tickets, boarding passes, legal documents, etc. are not only authentic but also are being presented by the appropriate person. This user specific information is associated with the identifier embedded in the printed object by the embedding system, which communicates the association between the ID and the specific user to the database at the time of embedding.

As shown in FIG. 3, both the embedding and decoding systems may take advantage of a database for a variety of functions. This database may be local or remote as shown in FIG. 3. The embedding and decoding systems shown in FIG. 3 include a communication application (40, 54, respectively). This application enables the systems to communicate with the database system via a network. For the typical implementation adapted for computer networks like the Internet, this communication application represents network communication software and network interface hardware to connect computers on a network. For example, the communication application implements a TCP/IP protocol, and uses standard communication technologies like SSL, HTTP, and XML to pass information. The specific connections can be made over a public or private network, WAN, or LAN. Both the embedding and decoding system can be designed to be portable or fixed at one location, either with a connection to the network that is always on or that is established on demand.

The database in FIG. 3 communicates with the embedding and decoding systems via a compatible communication application 60. For example, an application adapted for the internet uses standard Internet communication protocols, and if security is desired, a secure connection like SSL. As shown, the database may also communicate with the other remote systems through a firewall that restricts communication to messages from authenticated machines and/or users. To authenticate a machine, the firewall only allows message packets from machines with a particular machine address (e.g., a particular set or class of IP addresses). To authenticate individual users of the embedding and decoding systems, the firewall requires the user to enter the appropriate password and log-in information. For some applications, the database may be public, in which case, these security measures are not necessary.

Behind the firewall, a database management system 64 manages requests for embedding transactions and verification transactions. For certain applications, it maintains an ID database 66 of identifiers (IDs). These identifiers are embedded in the watermark payload of printed objects and used to link back to a database entry for verification or other functions (like linking to a web page or e-commerce transaction, etc.).

The embedding system gets IDs for embedding either in blocks or on demand from the ID database via the database management system. The embedding system, for example, may request a block of IDs for later embedding into watermarked images to be printed on objects. Alternatively, the embedding system may request IDs as needed in a real time connection with the database. In some applications, the database management system implements an electronic transaction to charge a customer's account for each ID or block of IDs that have been requested or registered with that customer. The transaction is associated with the customer via a secure transaction involving customer authentication via a password, and machine authentication via a particular machine address or signature supplied by the embedding computer or printer.

The database entry may include information to verify the authenticity of the printed object, such as features of the document that can be compared with the document to check for authenticity (such as a document number, a machine readable code on the document, a hash of text on the document, a hash of perceptual image features of the document image, etc.). The database may also include information to verify the authenticity of the bearer of the printed objects, such as a special user password or user ID, a picture of the user, or other biometric data of the user (hand writing signature, iris or retinal scan, fingerprint, voice signature, key stroke signature, etc.). This information is captured from the user or embedding system at the time of embedding and added to another database called the ID-Object association database 68.

In particular, the embedding application records the IDs along with the related object and/or user authentication information at the time that the IDs are embedded into the printed objects. If the embedder application maintains a real-time connection with the database, it transfers the ID along with the associated authentication information back to the database management system 64, which in turn, creates a database record in the ID object association database 68. The embedder application may also implement a store and forward approach, where it records the ID-authentication information associations, and forwards them to the database when a connection is available.

The embedding system may also associate additional information with printed objects. For example, the customer may want to associate a particular web site address with a printed object so that the printed object is dynamically linked to the web site by the decoding application in conjunction with a look up operation in the ID object association database. For example, in one application for sports tickets, the bearer of the ticket shows the ticked to a web camera connected to a computer enabled with watermark decoding software. The watermark decoder application transmits the ID extracted from the watermarked image on the ticket to the database management system, which in turn, looks up the web site address in the ID-object association database 68 indexed by the ID number. The database management system then returns the web site address to the user's computer, which launches a web browser and fetches the web page at the supplied web address.

For some applications, the database management system is configured to have a public and private side. The public side is used to link watermarked objects to related information, by returning the related information just like the web address in the previous paragraph. The private side is used for authentication operations, such as checking whether a printed object is authentic, checking whether the bearer of the printed object is valid, etc.

In addition to linking to authentication information, the identifiers may also serve the function of representing units of value associated with the printed object. For example, the printed object may be a pass for a bus, train, ski lift, etc. At embedding, the embedding system associates the number of units of value to be associated with the printed object, and charges the buyer's account (electronically debits the buyer's account by the units of value associated with the printed object). At the decoding side, the decoder application 50 extracts an embedded identifier from the watermark in the image on the object, and connects to the database to determine the amount of value associated with the identifier in the database. The database management system decrements the number of units remaining for the object with each use of the watermarked object. When the number of units remaining drops to zero, the database management system sends back a control signal indicating that the watermarked object is no longer valid.

One variation to this approach is to program the database management system to return control signals to the decoding system for display to the user. In this variation, the control signals warn the user that the number of units remaining has dropped below a threshold, and offer the user the opportunity to buy more units via a secure electronic transaction over the network, such as a credit card transaction. When the user buys more units and refreshes the object in this manner, the database management system increments the number of units associated with the printed object.

The database further includes a customer database 70 to maintain customer account information, such as customer passwords for user authentication and financial transaction information associated with the purchase of identifiers associated with embedding transactions.

In some system designs, the design requirements dictate that the database management system act as a router to other secure databases controlled by different entities. For example, a number of different customers may wish to maintain their own authentication databases, and databases for controlling use of the printed objects under their control. In this case, the database management system 64 uses one or more layers of indirection to link the customer's database to the decoder application 50. In particular, the ID-object association database 68 stores a relationship between an ID and a customer system (e.g., the network address of the computer system controlled by the customer). For authentication or other actions triggered by the ID in the watermark, the database management system 64 looks up the customer's computer address in the database 68 using the ID from the watermark, and either forwards the ID to the customer's database system using the computer address of that system, or returns the customer address information to the decoding system, which in turn establishes a secure connection with the customer database. In the first case, the database management system also forwards a computer address of the decoding system to the customer database (e.g., the IP address) so that it can respond directly to the decoder application 50 running in the decoding system.

Using this approach, the database management system can act as a router to send transaction requests to many different customer databases in response to decoding a watermark payload. Some objects may even be associated with more than one customer. For example, when a user presents a ticket for verification, the decoding system sends the ID extracted from the watermark to the database management system 64, which in turn, forwards it to the ticketing agent's computer for authentication. The database management system may also link the decoding system to another party's computer, such as the ticket promoter's web site for more information (e.g., promotional information, information about the ticket, electronic commerce opportunities to buy more tickets or related products or services, etc.) As noted previously, the decoding system does not require a connection to a local or remote authentication database to authenticate the printed object. In some cases, the object can be authenticated by checking the strength or for the presence of a fragile watermark signal. Also, the watermark payload can be designed to carry authentication information like a hash of the watermarked image on the object. To authenticate the image, the hash is decoded from the watermark and compared with a new hash computed of the image of the object (optionally realigned to correct for geometric distortion relative to the orientation, scale and position of the image data when the embedded hash was computed). The sensitivity of the hash to changes can be tuned to detect modifications due to photocopying, scanning, or re-printing. Preferably, the hash is computed of features of the image, such as energy or power at selected spatial frequencies or certain color attributes that degrade predictably in response to photocopying or printing operations. Such an image hash may allow benign image editing like brightness or contrast changes, but detects content additions or deletions to the image. Geometric distortion introduced by copying may also be detected by observing aspect ratio changes of certain visible or hidden fiducials printed in the image.

Another form of authentication is to use certain image features, text content on the printed object, or information provided by the user (such as password, user ID, or other user specific information) as a key to create a watermark pattern (e.g., as a key to a PN number generator that is used to create a noise image that is adapted to the image and added to it). At authentication time, the information used to create the key is obtained from the object, the user, the authentication database, or a combination of these sources. The decoding system then creates the watermark signal from the key, and if the watermark is present, the printed object is authentic. If it is not present, the printed object is deemed not authentic.

EXAMPLE APPLICATIONS

The following sections describe how the system may be adapted for a variety of types of printed objects. In each of these cases, copy detection technology, such as fragile watermarks, authentication hashes embedded in the watermark, or special authentication keys used to create the watermark may be used to authenticate the printed object. In addition, the watermark may carry information that is used to access and index information in a database or on a computer network as described above.

Stocks and Bonds

The system shown in FIG. 3 can be used to create print stock certificates and bonds with copy detection watermarks to verify their authenticity. In addition, decoding systems can use the identifier embedded into the watermarks on the documents to link to the database, where information for authenticating the document and/or its owner are stored. As title changes, the database can be updated to associated the current owner and other transaction information with the identifier embedded in the document. Also, the database management system can keep a log of when, where, and by whom the document is presented for authentication and generate detailed reports providing such transaction information.

Visas and Passports

The system can be used to implement similar functions for visas and passports. In particular, the database can be used to store information about the bearer of the visa or passport, such as a photo, unique user identifier or other information. In the verification process, the decoder extracts the information from the watermark and compares it with authentication information elsewhere in the document or in the database. If the information does not match, then the passport or its bearer are not valid.

For database applications, the passport may be linked to a unique database entry via an identifier embedded in the watermark. For example, border control personnel can compare a photo returned from the database with the person bearing the document to authenticate the bearer of the passport.

Legal Documents

The system can be used to verify and manage legal documents, such as contracts, deeds, title, etc. In addition to providing an authentication function, the watermark can link to a database for additional information about the document in the database via the identifier in the watermark payload. This information may include contact information for the parties of the contract, version control information to indicate whether the contract is the most current and valid document in a series of related documents, information for authenticating that a contract document has been fully executed by all parties, etc.

Insurance Policy

The system can be used for similar functions for insurance policies. In addition, important text information, such as the nature of the insured property, can be stored in a secure database that can be accessed via the identifier embedded in the watermark. If the watermark is unreadable, the insurance policy has been tampered with and is not authentic. If the watermark is readable, but the content on the document has been changed, then the text information in the secure database can be checked by indexing it using the identifier in the watermark payload. This text can then be matched with the text on the document to verify its accuracy. Alternatively, a hash of the text can be embedded in the watermark payload, and compared with a hash of the text on the document to give the document another self authenticating feature.

Purchase orders, Purchase requisitions, Invoices, Bills

The system can be used to authenticate purchase orders, purchase requisition and invoices. In addition, the watermark payload can index information about the purchase order/requisition or invoice in the system's database. The database can provide a variety of information, including financial information regarding the status of the transaction that is dynamically updated as the document is processed. The database returns information for display, such as the transaction status: pending, fulfilled, shipped, shipping date, paid, balance overdue, goods returned, etc. The decoding stations can be used to update the status in the database by sending status updates to it as the document is processed.

Bank statements, Credit Card statements

The system provides an effective way to authenticate bank and credit card statements. In addition, the identifier extracted from the watermark on the statement links to personal financial records, account information, etc. stored in the database. This enables the user to show the statement to a digital camera or scanner in a decoding system, and link automatically to related financial records, and account status information. Special user information provided by the user or embedded in the watermark can be used to generate an access code to get access to the database records.

Transportation Tickets

The system can be used to print and authenticate a variety of transportation passes and tickets, such as a single use and multiuse bus or train ticket, an airline ticket and airline boarding pass. The copy detection watermark, in these applications, is used to authenticate the pass. In addition, the watermark payload may be used to authenticate the user as well. For example, the user enters a code at a check-in or verification terminal. This terminal then compares the code with information in the watermark payload, or information linked to the pass via the watermark on the pass. If the user information entered by the user matches the authentication information on the card or in the database linked by the watermark, then the terminal deems the user to be valid. The user information in the watermark payload or database may be related to the information supplied by the user via a cryptographic function such as a cryptographic hash.

In addition, the pass may be associated with some number of passes or rides via the identifier embedded in the watermark. Each time the pass is used, the watermark is decoded and the corresponding number of passes linked to the object via the watermark is decremented. The identifier in the watermark links the object to a database that stores information about the object, including the number of passes available.

Event Tickets

The system can be used to authenticate event tickets and the users of those tickets as described above. In addition, the watermark can be used to link to additional information about the event that is general or specific to the particular ticket. For example in one application, the database returns images showing how to get to the seat and what the view is from the seat of the event.

Birth Certificates

The system can be used to authenticate birth certificates, as well as link to records in a database relating to the birth certificate, such as when and where the certificate was issued, and procedures for ordering additional copies, etc.

Diploma

The system can be used to authenticate diplomas and other similar items like a certificate of mastery from a class, professional licenses (contractor, doctor, lawyer), etc. In addition, the system can be used to authenticate the bearer of the document to verify that the person presenting the document is its valid owner.

Permits

The system can be used to authenticate permit documents like building permits and inspection permits. In addition, the watermark may also carry an identifier that links the permit to a records database for more information about the project to which the permit relates.

Timesheets

The system can be used to authenticate time sheets and link to an accounting database for related information about a particular project to which the timesheet relates.

Personal Cards

The system may be used to create and verify a variety of types of personal cards, like voter registration cards, library cards, phone cards, financial cards, insurance cards, photo IDs, and other membership cards (health club, etc.). The decoding system can also be used to control access to certain places or things. For example, the system could verify a voter card as well as the voter at a voting booth. In addition, the system maybe used to keep a record of the vote to prevent the voter from voting more than once.

The watermark on the library card could also be used to link the user to a database of book check in/check out transactions and provide information about when items are due.

Product Labels

As detailed above, the system can be used in product security applications to authenticate clothing and merchandise labels, tags, certificates of authenticity, etc. In addition, the watermark can including an identifier that links to a database entry or web site that has product information, warranty information, user instructions, options to purchase related items and accessories, etc.

Using watermarks for product security and links to information applies to product packaging and the products themselves. It can be used on a variety of products, including music CDs, software CDs (both the cover and the physical item), VHS cassettes (both the sleeve and label), DVD ROM (both the cover and the physical item), certificates of authenticity for software, tags for popular items for trading, like Beanie Babies toys, or other merchandise, etc.

Forensic Photographs

Fragile digital watermarks can be used to check whether a digital image has been tampered with. However, such applications may not extend to cases where such photographs are printed and kept in a physical file. The system described above can be used to embed authentication watermarks in such images before they are printed. The authentication watermark can be used to authenticate the printed image and also link to a database where a pristine digital copy of the image is stored securely. This applies to prints of insurance photos taken digitally, prints of evidentiary photos (crime scene, etc.), and a variety of other applications.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

I claim:

1. A system for authenticating a printed object comprising:
   a watermark decoder for detecting a copy detection watermark in a printed object to determine whether the printed object has been reproduced; and
   a verification module for processing a message decoded from an authentication watermark on the printed object to authenticate the printed object or bearer of the printed object.

2. The system of claim 1 wherein the message comprises an identifier that is used to look up authentication information in a database, and including:
   a communication application for communicating the identifier to the database to fetch the authentication information associated with the printed object and to provide the authentication information to the verification module.

3. The system of claim 2 wherein the verification module compares authentication information from the database with authentication information provided by the bearer of the printed object to authenticate the bearer of the printed object or the printed object.

4. The system of claim 2 wherein the verification module compares authentication information from the database with authentication information read from a machine readable code on the object to authenticate the object.

5. The system of claim 2 wherein the verification module compares authentication information from the database with authentication information derived from a hash of information on the object.

6. The system of claim 5 wherein the hash is computed of an image on the object.

7. The system of claim 5 wherein the hash is computed of text on the object.

8. The system of claim 1 wherein the copy detection watermark and the authentication watermark are the same.

9. The system of claim 1 wherein the copy detection watermark comprises one or more watermarks that degrade in response to a reproduction operation on the printed object in a manner that is detectable in a decoding of the one or more watermarks from a reproduced version of the printed object.

10. The system of claim 1 wherein the message includes bearer information that is compared with information provided by the bearer to authenticate the bearer of the printed object.

11. The system of claim 1 wherein the message includes information that is compared with other information derived by machine from the object to authenticate the object.

12. The system of claim 1 wherein the message is associated with a monetary value for the printed object.

13. The system of claim 1 wherein the verification module checks the message associated with the printed object to determine whether the printed object is valid for a particular action.

14. The system of claim 13 wherein the printed object is a ticket or pass and the particular action is entry to an event or access to a vehicle.

15. The system of claim 1 wherein the message includes a time stamp that is used to determine whether validity of the printed object has expired.

16. A system for creating a printed object comprising:
   a watermark encoder for encoding a watermark in an image to be printed on a printed object, wherein the watermark is used to authenticate the printed object; and
   a communication application for obtaining an identifier from a identifier database for embedding into a message payload of the watermark and for providing information to be associated with the identifier to an object-identifier association database;
   wherein the watermark is a copy detection watermark that degrades in response to a reproduction operation performed on the printed object.

17. A system for creating a printed object comprising:
   a watermark encoder for encoding a watermark in an image to be printed on a printed object, wherein the watermark is used to authenticate the printed object; and
   a communication application for obtaining an identifier from a identifier database for embedding into a message payload of the watermark and for providing information to be associated with the identifier to an object-identifier association database;
   wherein the information is user information to authenticate the bearer of the printed object.

18. A system for creating a printed object comprising:
   a watermark encoder for encoding a watermark in an image to be printed on a printed object, wherein the watermark is used to authenticate the printed object; and
   a communication application for obtaining an identifier from a identifier database for embedding into a message payload of the watermark and for providing information to be associated with the identifier to an object-identifier association database;

wherein the information is a time stamp that is used to determine whether the printed object has expired.

19. A system for creating a printed object comprising:

a watermark encoder for encoding a watermark in an image to be printed on a printed object, wherein the watermark is used to authenticate the printed object; and a communication application for obtaining an identifier from a identifier database for embedding into a message payload of the watermark and for providing information to be associated with the identifier to an object-identifier association database;

wherein the encoder is operable to encode a first watermark that includes the identifier linking the printed object to the object-identifier database, and a second, fragile copy detection watermark for discriminating between an original and a reproduction of the printed object.

* * * * *